United States Patent
Damola et al.

(10) Patent No.: US 8,027,353 B2
(45) Date of Patent: Sep. 27, 2011

(54) IMS SERVICE PROXY IN HIGA

(75) Inventors: Ayodele Damola, Solna (SE); Joacim Halén, Sollentuna (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 244 days.

(21) Appl. No.: 12/303,170

(22) PCT Filed: Mar. 21, 2007

(86) PCT No.: PCT/EP2007/002503
§ 371 (c)(1),
(2), (4) Date: Dec. 2, 2008

(87) PCT Pub. No.: WO2007/140834
PCT Pub. Date: Dec. 13, 2007

(65) Prior Publication Data
US 2009/0190603 A1    Jul. 30, 2009

Related U.S. Application Data

(60) Provisional application No. 60/803,726, filed on Jun. 2, 2006.

(51) Int. Cl.
| H04L 12/28 | (2006.01) |
| H04L 12/56 | (2006.01) |
| H04J 3/16  | (2006.01) |
| H04J 3/22  | (2006.01) |
| G06F 15/16 | (2006.01) |

(52) U.S. Cl. ......... 370/401; 370/466; 370/467; 709/249

(58) Field of Classification Search .................. 370/401, 370/460, 467; 709/249
See application file for complete search history.

(56) References Cited

U.S. PATENT DOCUMENTS

| 6,590,865 B1 * | 7/2003 | Ibaraki et al. ................. 370/230 |
| 2002/0110104 A1 | 8/2002 | Surdila et al. |
| 2005/0144635 A1 * | 6/2005 | Boortz ............................ 725/32 |
| 2005/0164777 A1 * | 7/2005 | Daly .............................. 463/20 |
| 2006/0007954 A1 * | 1/2006 | Agrawal et al. ............... 370/466 |
| 2006/0052081 A1 * | 3/2006 | Cho .............................. 455/403 |
| 2006/0251234 A1 * | 11/2006 | Cooke ....................... 379/221.07 |
| 2008/0298237 A1 * | 12/2008 | Dos Remedios et al. ..... 370/233 |

FOREIGN PATENT DOCUMENTS

GB    2419774 A    5/2006

* cited by examiner

*Primary Examiner* — Ayaz Sheikh
*Assistant Examiner* — Tarell Hampton
(74) *Attorney, Agent, or Firm* — Roger S. Burleigh

(57) ABSTRACT

The present invention relates to a communication system (SYS), a gateway apparatus (HiGA) and a method for allowing services of a first type provided by a communication server (IMS-S) to be provided to terminal devices (T1, T2, ... Tn ... TN) of a home network (CPN) independent of the fact whether the terminal devices are of a first type or a second type (IMS-based or non-IMS-based). The gateway apparatus (HiGA) comprises one or more service-specific mapping applications (AS) for adapting the control plane (SIP) used between the second type terminal devices (T2) to the control plane (HTTP) used between the gateway apparatus (HiGA) and the communication sever (IMS-S).

31 Claims, 11 Drawing Sheets

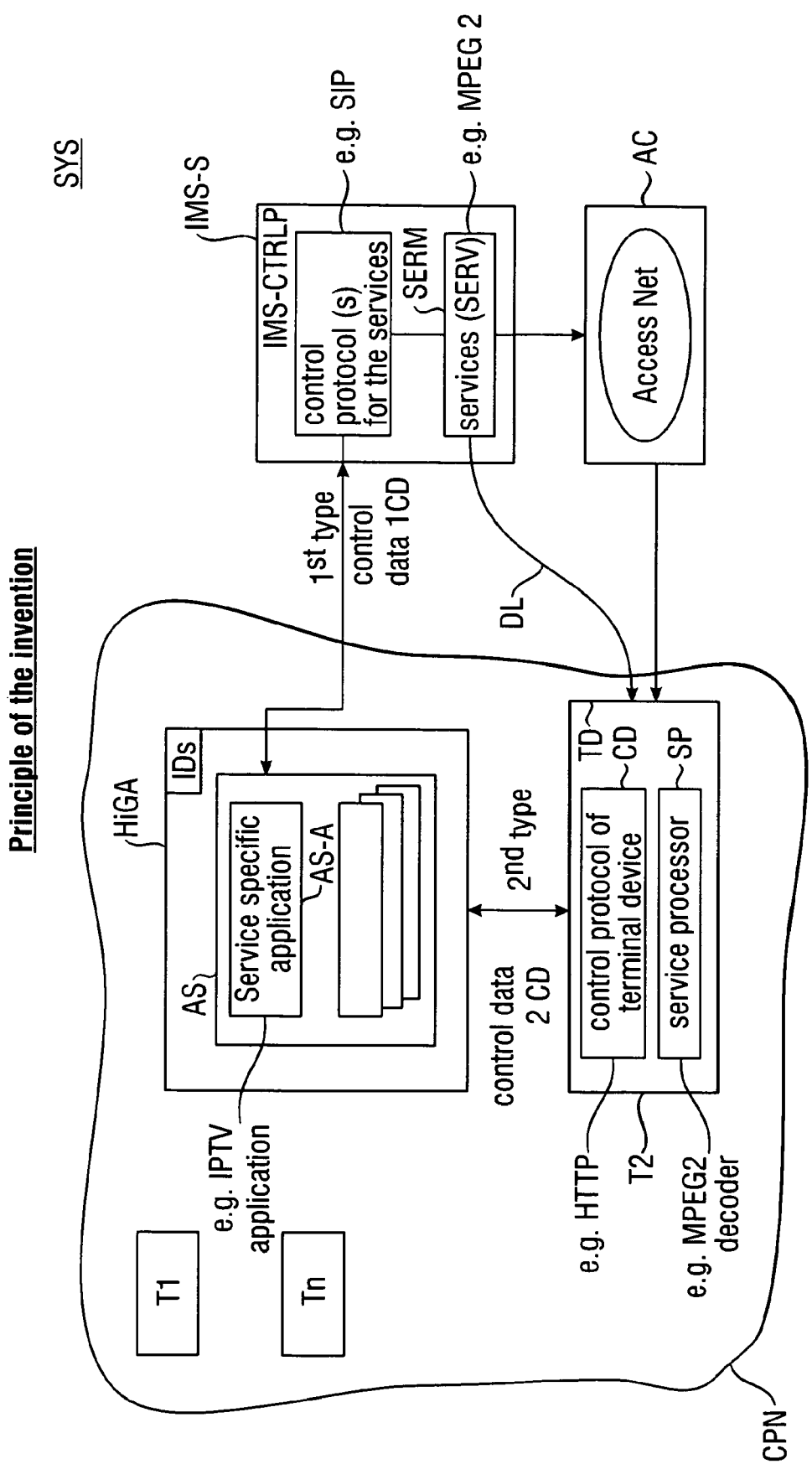

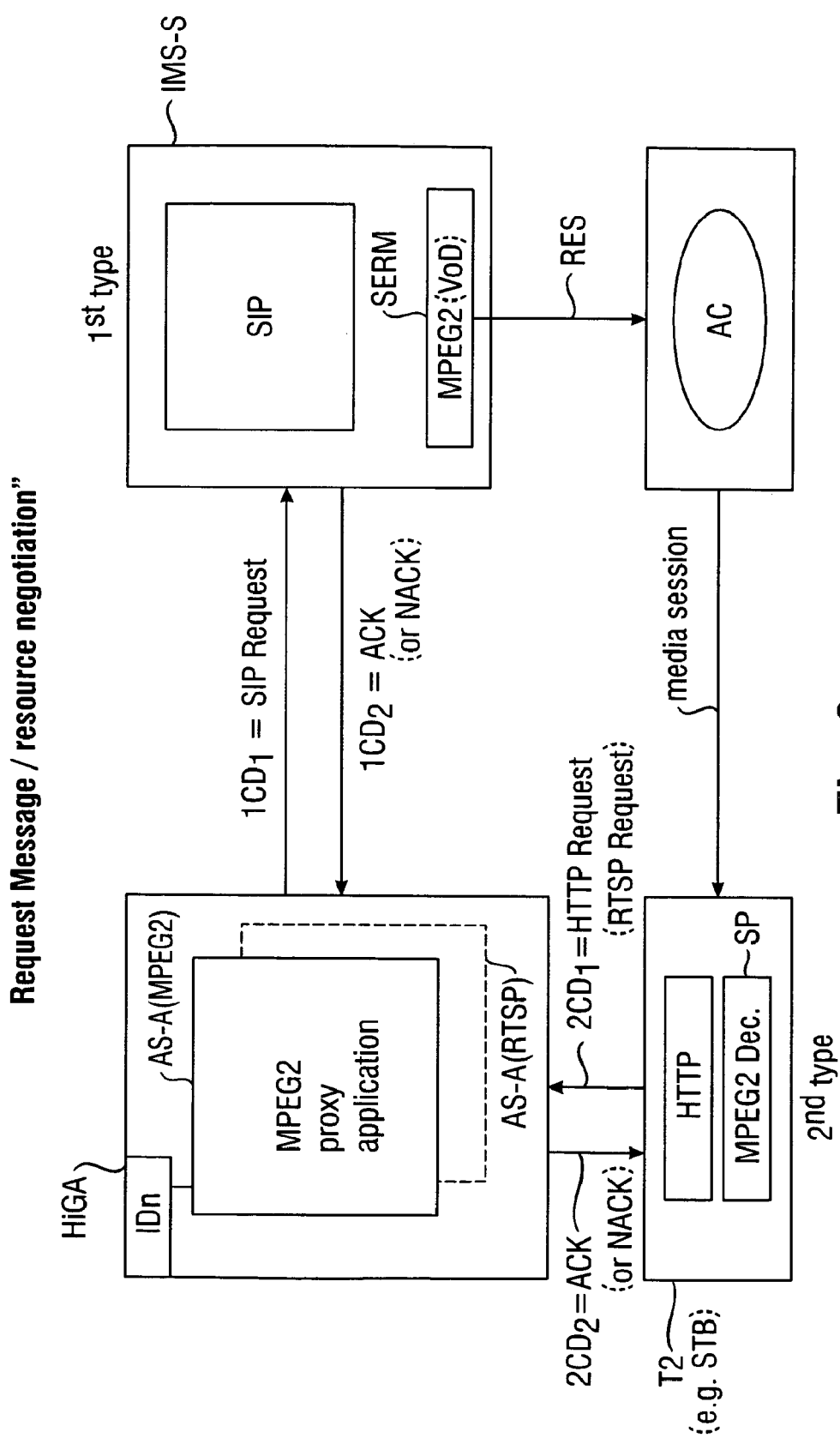

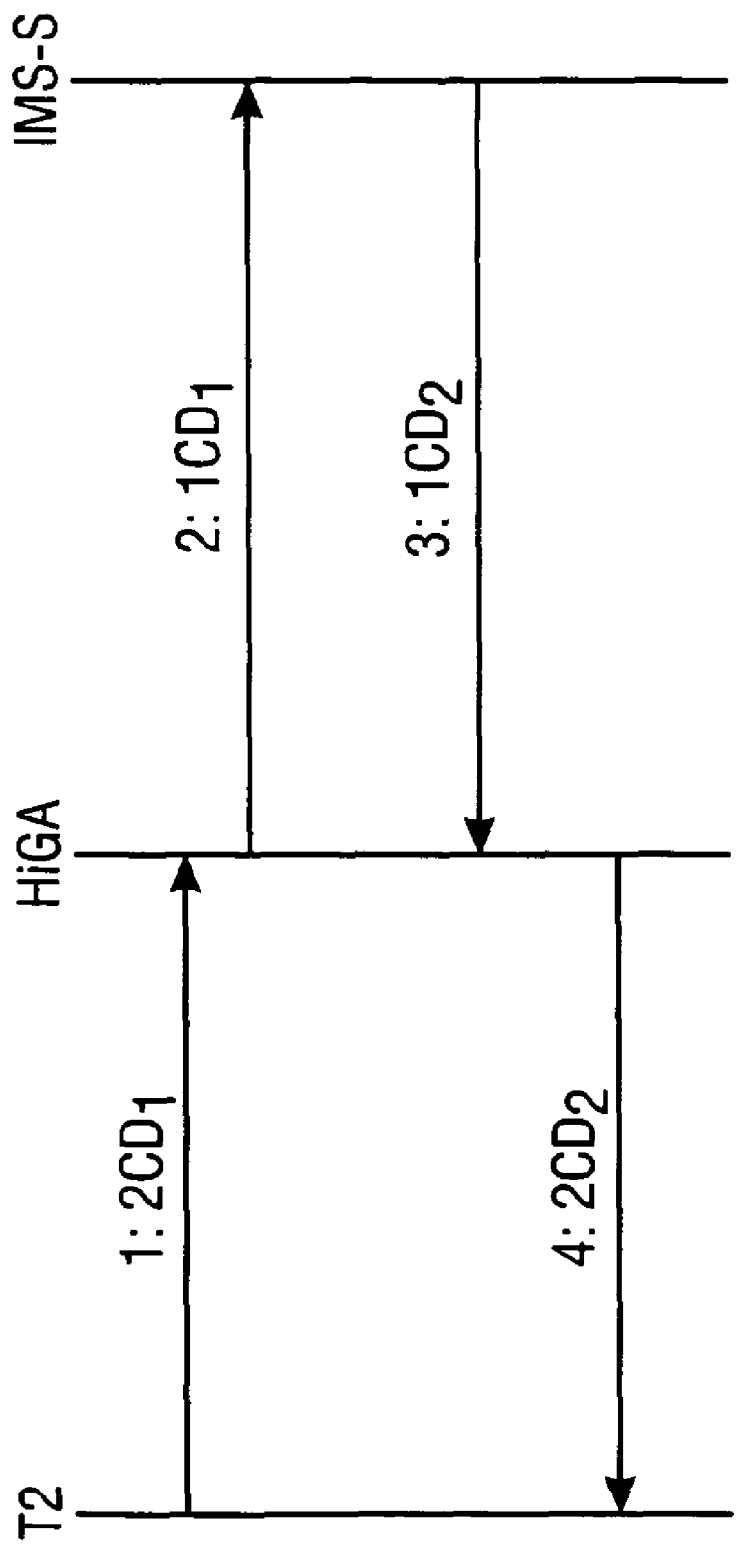
Fig. 3 Principle Method of the invention

IMS SERVICE PROXY IN HIGA

This application claims the benefit of U.S. Provisional Application No. 60/803,726, filed Jun. 2, 2006, the disclosure of which is fully incorporated herein by reference.

TECHNICAL FIELD

The present invention relates to a communication system, a communication method and a gateway apparatus which allow terminal devices of the communication system to access and use services provided by a service providing server of the communication system.

In particular, the present invention relates to a situation in which the service providing server provides services having application-specific attributes which cannot be resolved by standard terminal devices. That is, the invention relates to a situation in which the service providing server is of a first type and the communication system may comprise first type terminal devices as well as second type terminal devices. The first type terminal devices will understand and resolve control data associated with services provided by the first type service providing server. However, there are also second type terminal devices which will not be able to understand and resolve the first type control data associated with the services having application-specific attributes (service-specific features) provided by the first type service providing server.

BACKGROUND

FIG. 1a shows a communication system SYS for illustrating the background and the problems to be solved by the invention. In FIG. 1a a home network (Customer Premises Network) CPN comprises a number of terminal devices T1, T2, ... Tn ... TN. The home network CPN may be connected to a service network which is denoted with IMS-N in FIG. 1a. In the home network CPN or the connected service network IMS-N there is arranged a service providing server IMS-S which provides specific services to the terminal devices T1, T2, ... Tn ... TN, e.g. in an IMS type communication system VoIP, video conferencing and IPTV.

The access procedure and delivery procedure is provided by a gateway apparatus which is denoted with HiGA in FIG. 1a. In response to an access message AC from a terminal device, e.g. T1, to the gateway apparatus HiGA, the service providing server IMS-S will deliver the requested service by means of a delivery message DL forwarded by the gateway apparatus HiGA. Normally, if the service providing server IMS-S and the terminal devices T1, T2, ... Tn ... TN are of the same "type", then there will be no problems in the accessing and provision (delivery) of the services of the service providing server IMS-S, even if the services also have application-specific attributes associated with them. However, if the service providing server IMS-S is of a first type and the terminal device is of a second type incapable to understand the specific first type control data (application-specific attributes) associated with the services, then only the services provided by the service providing server IMS-S can be delivered to the second type terminal device but there is no possibility that first type control data associated with the service is decoded and used in the second type terminal device. Hereinafter, to further illustrate this aspect, a more specific example relating to IMS services will be explained also to FIG. 1b, 1c.

The examples in FIG. 1c, 1b, 1c are for a case in which the gateway apparatus is formed by a HiGA (Home IMS GAteway) and the terminal device T1 (first type terminal device) is a SIP device (SIP: Session Initiation Protocol), and the terminal device T2 (second type terminal device) is a non-SIP device. As explained before, the HiGA is a functional block (gateway) residing in the home network CPN which thus enables SIP and non-SIP terminal devices to access IMS-based services provided from by the service providing server IMS-S. IMS-based services may include communication services such as VoIP (Voice over IP) and video conferencing, as well as other multimedia services, such as IPTV, as also indicated in FIG. 1a.

One of the characteristics of for example IPTV offered as an IMS service is that it allows a personalisation of TV content delivered to end users, for example the delivery of personalized advertisements based on user identity and preference. For this purpose, the HiGA maintains a user profile in a user profile memory UP-MEM shown in FIG. 1b. Such a user profile may for example be stored in the exchange portion EX of the gateway device HiGA shown in FIG. 1c. A user profile is maintained for every subscription which is linked to an IMS service identity. For example, as shown in FIG. 1b, each user identity (USER-ID) is associated with a specific preference (control information) and service identification IMS-ID. For example, different TV programs may be available to each individual user in their EPG (Electronic Program Guide) such as, as shown in FIG. 1b, ID1="dad"/control info="sports"; ID2="son"/control info="movies and kids programs" and IDn="mother"/control info="advertisements". IF such specific preferences (control info) are indicated, the HiGA will make sure that the requested service is delivered to the user (terminal device) in a personalised way by means of the control information.

For example, if a first type terminal device T1 sends a service delivery request including a user-ID=ID2, then HiGA will know that a personalized electronic program guide EPG2 is to be retrieved from the service providing server IMS-S and HiGA will send a request for EPG2 to the server IMS-S. Alternatively, if the server IMS-S includes a user-specific preference mapping table mapping between user identity ID and control information IMS-CTRL, as shown in FIG. 1c, it may be sufficient if the first type terminal device T1 merely sends its user-ID ID1 (first tape control information) to the server IMS-S through the HiGA and the server IMS-S will return the first type control information (control data) to the first type terminal device T1 which is capable of decoding and using the provided first type (personalized, i.e. user and service-specific) control information EPG1 In this way, personalised content can be delivered to a specific subscription and hence to a specific user, provided that the terminal device and the server run the same (first type) control protocol. Typically, in a communication system having an IMS server IMS-S, both the terminal device T1 and the server IMS-S run the same SIP control protocol and can therefore "talk" to each other using this protocol.

Whilst HiGA provides essentially an IMS-SIP proxy (exchange) functionality for providing IMS communication services to both SIP and non-SIP (e.g. UPnP (Universal Plug and Play)) home devices, the IMS system, i.e. the application server IMS-S in the home network CPN or in the interconnected services network IMS-N, provides a multitude of multimedia services, as shown in FIG. 1a, including IPTV, VoIP, video conferencing etc. and typically such IMS services could have application (service)-specific attributes (control information) which cannot be used and understood by standard terminal device T2 running a different second control protocol, as indicated in FIG. 1a. For example, the IPTV service might have application-specific attributes such as EPG (Electronic Program Guide) and service triggers. A voice over IP service may have specific attributes in terms of specific adverts or music. If the end terminal device is also an IMS-based terminal device, then of course there is no problem to deliver the application (service)-specific attributes associated with this service to a (first type SIP) terminal device T1. However, there is a problem if the terminal device is of a different type (second type), i.e. non-IMS-based, because in this case the application-specific attributes (control information) associated with this IMS-based service cannot be "understood" by the control protocol of a non-IMS-based first type terminal device T2. This problem does not only relate to the more sophisticated provision of personalized content from the server IMS-S but even to a simple request scenario.

For example, the first terminal device T1 may be capable of decoding a delivered MPEG2 stream by means of a service processor SP (MPEG2 decoder). However, it may use a HTTP (first type) control protocol for requesting this MPEG2 service from the server IMS-S. If the server IMS-S runs a second control protocol, for example SIP, then the first terminal device T1, not supporting IMS SIP, can not access media at the server IMS-S with the HTTP request. Another example is if the first terminal device T1 requests a service, e.g. a video streaming, requiring a certain bandwidth (certain resources) in the access network and the access network is incapable to provide the required resources. Since the first and second control protocols are different, the terminal device will not be capable e.g. to negotiate with the server IMS-S that a certain lower bandwidth is acceptable for a video streaming with e.g. lower quality.

Many off-the-shelf terminal devices T2, such as for example a simple standard Set-Top-Box STB, running simple request messages without having assigned to them specific user-IDs, are only capable to decode or run the service, but they are not capable to provide any user-specific features, i.e. they are "blind" and simply run the service in a user-unrelated fashion.

SUMMARY

As explained above, there is a problem in that some second type terminal devices T2 are incapable to exchange with the server IMS-S first type control information (control data) associated with a service to be provided because the control protocols of the server IMS and the second type terminal devices T2 are different.

Therefore, the object of the present invention is to provide a communication system, a communication method and a gateway apparatus for allowing second type terminal devices running a second type control protocol to execute services in association with first type control information provided by a first type service providing server.

This object is solved by a communication system, comprising a gateway apparatus, a plurality of terminal devices and a service providing server for providing services to said terminal devices through an access network, wherein said service providing server comprises a service memory for storing one or more services to be provided to said terminal devices, and at least one control protocol device of a first type providing first type control data in association with said one or more services to said gateway device; wherein said terminal devices each comprise a service processor for processing the service provided by said service providing server through said access network and a control protocol device of a second type, different to said first type and providing second type control data in association with the execution of the service by said service processor to said gateway device; and wherein said gateway apparatus comprises one or more service-specific mapping devices for exchanging first type control data with said service providing server and second type control data with said terminal devices wherein said service-specific mapping devices provide to said service providing server first type control data on the basis of second type control data received from said terminal devices and receive first type control data from said first type control protocol device of the service providing server; and said service-specific mapping devices provide to said terminal devices second type control data on the basis of said first type control data received from said service providing server and receive said second type control data from said second type control protocol device of said terminal devices.

Furthermore, this object is solved by a gateway apparatus of a communication system including a plurality of terminal devices and a service providing server for providing services to said terminal devices through an access network, wherein said service providing server comprises a service memory for storing one or more services to be provided to said terminal devices, and at least one control protocol device of a first type providing first type control data in association with said one or more services to said gateway device, wherein said terminal devices each comprise a service processor for processing the service provided by said service providing server through said access network and a control protocol device of a second type, different to said first type and providing second type control data in association with the execution of the service by said service processor to said gateway device, comprising one or more service-specific mapping devices for exchanging first type control data with said service providing server and second type control data with said second type terminal devices, wherein said service-specific mapping devices provide to said service providing server first type control data on the basis of second type control data received from said terminal devices and receive first type control data from said first type control protocol device of the service providing server; and said service-specific mapping devices provide to said terminal devices second type control data on the basis of said first type control data received from said service providing server and receive said second type control data from said second type control protocol device of said terminal devices.

Furthermore, this object is solved by a communication method between a gateway apparatus, a plurality of terminal devices and a service providing server of a communication system for providing services to said terminal devices through an access network, wherein said service providing server comprises a service memory for storing one or more services to be provided to said terminal devices, and at least one control protocol device of a first type providing first type control data in association with said one or more services to said gateway device, wherein said terminal devices each comprise a service processor for processing the service provided by said service providing server through said access network and a control protocol device of a second type, different to said first type, and including second type control data in association with the execution of the service by said service processor, and wherein said gateway apparatus comprises one or more service-specific mapping devices for exchanging first type control data (1CD) with said service providing server and second type control data with said terminal devices, comprising the following steps of providing from at least one of said terminal devices to said gateway apparatus second type control data, providing from said service-specific mapping devices of said gateway apparatus to said service providing server first type control data on the basis of said second type control data provided from said terminal device; providing first type control data from said first type control protocol device of said service providing server to said gateway apparatus, and providing from said service-specific mapping devices to said terminal device second type control data on the basis of said first type control data provided from said service providing server.

According to the invention, there is the special advantage that there are service-specific features in e.g. the HiGA gateway device for providing the necessary gateway functionality between e.g. IMS-based application (communication) servers and non-IMS terminal (home) devices. Hence, standard terminal devices can also be provided with some kind of personalized control information.

Preferably, said service-specific mapping devices comprise at least one service-specific mapping device running an IPTV proxy application.

Further preferably, said second type control data constitute a second type service request and said service specific mapping device sends as first type control data a first type enquiry request enquiring the service providing server whether said access network has enough resources to provide said service to the terminal device; wherein said service providing server sends as first type control data an acknowledgement message indicating that there are enough resources for the service provision if the service providing service establishes that there enough resources, and sends as first type control data a negative acknowledgement message indicating that there are not enough resources for the service provision if the service providing server establishes that there not enough resources.

Further preferably, said terminal device comprises a Set-Top-Box including as service processor an MPEG2 decoder, said service providing server comprises in said service memory as service a VoD (Video on Demand) service, said service-specific mapping devices comprise at least one service-specific mapping device running a RTSP proxy application and said control protocol is RTSP, and said resources are the bandwidth of lines in said access network.

Further preferably, said gateway apparatus and said terminal devices are part of a customer premises network.

Further preferably, said gateway apparatus is located in a residential gateway of said customer premises network.

Further preferably, said gateway apparatus receives as said second type control data from said terminal device an Electronic Program Guide (EPG) download request and said second type control data provided by said gateway apparatus comprises a personalized EPG.

Further preferably, said gateway apparatus comprises in a memory said user identity.

Further preferably, said user identity is stored on a plug-in inserted into said gateway apparatus or on an UICC card inserted into a memory of said gateway apparatus.

Further preferably, said terminal device is one or more selected from the group comprising a set-top-box, a controller of a heating system, a surveillance system in the home, a camera or a central home controller of an intelligent house.

Further preferably, said first type of said control data is SIP (Session Initiation Protocol) and said second type of said control data is one of HTTP or UPnP.

Further preferably, said gateway apparatus receives from said service providing device as first type control data said downloaded EPG of first type and converts a format of said received EPG into a format supported by said terminal device.

Further preferably, said gateway apparatus invokes a media session establishment between the terminal device and said service providing device.

Further preferably, said media session establishment is a unicast media session establishment.

Further preferably, said media session establishment is a multicast media session establishment.

Further preferably, said gateway apparatus receives as first type control data an EPG update message.

Further preferably, said gateway apparatus receives as first type control data an event trigger message and sends as second type control data a media session establishment message to said terminal device on the basis of said event trigger message.

Further advantageous embodiments and improvements of the invention are listed in the dependent claims. However, it should be noted that the invention also comprises features and steps which have been separately described in the claims, the drawings and the description. Therefore, the invention also comprises embodiments which are based on combinations of such features and steps.

Hereinafter, the invention will be explained with reference to the drawings.

BRIEF DESCRIPTION OF THE DRAWINGS

In the drawings:

FIG. 2a shows a block diagram of a communication system SYS in accordance with the invention;

FIG. 2c shows a second specific service provision example for the provision of an MPEG2 stream in case that the requesting control protocol of the second terminal device T2 and the control protocol of the server IMS-S are different, in particular also the negotiation of resources RES for the access network AC;

FIG. 3 shows a flowchart of the communication method of the invention;

FIG. 4 shows an embodiment and examples of the invention for the special case of a HiGA with an application space for IPTV, as shown in FIG. 2d, wherein

DETAILED DESCRIPTION

Hereinafter, first the principle of the invention will be described with reference to FIG. 2a which is a block diagram of a communication system SYS in accordance with the invention. It comprises a gateway apparatus HiGA, a plurality of terminal devices T1, T2, . . . Tn . . . TN and a service providing server IMS-S for providing services SERM to said terminal devices T1, T2, . . . Tn . . . TN through an access network AC.

Figure 1A:
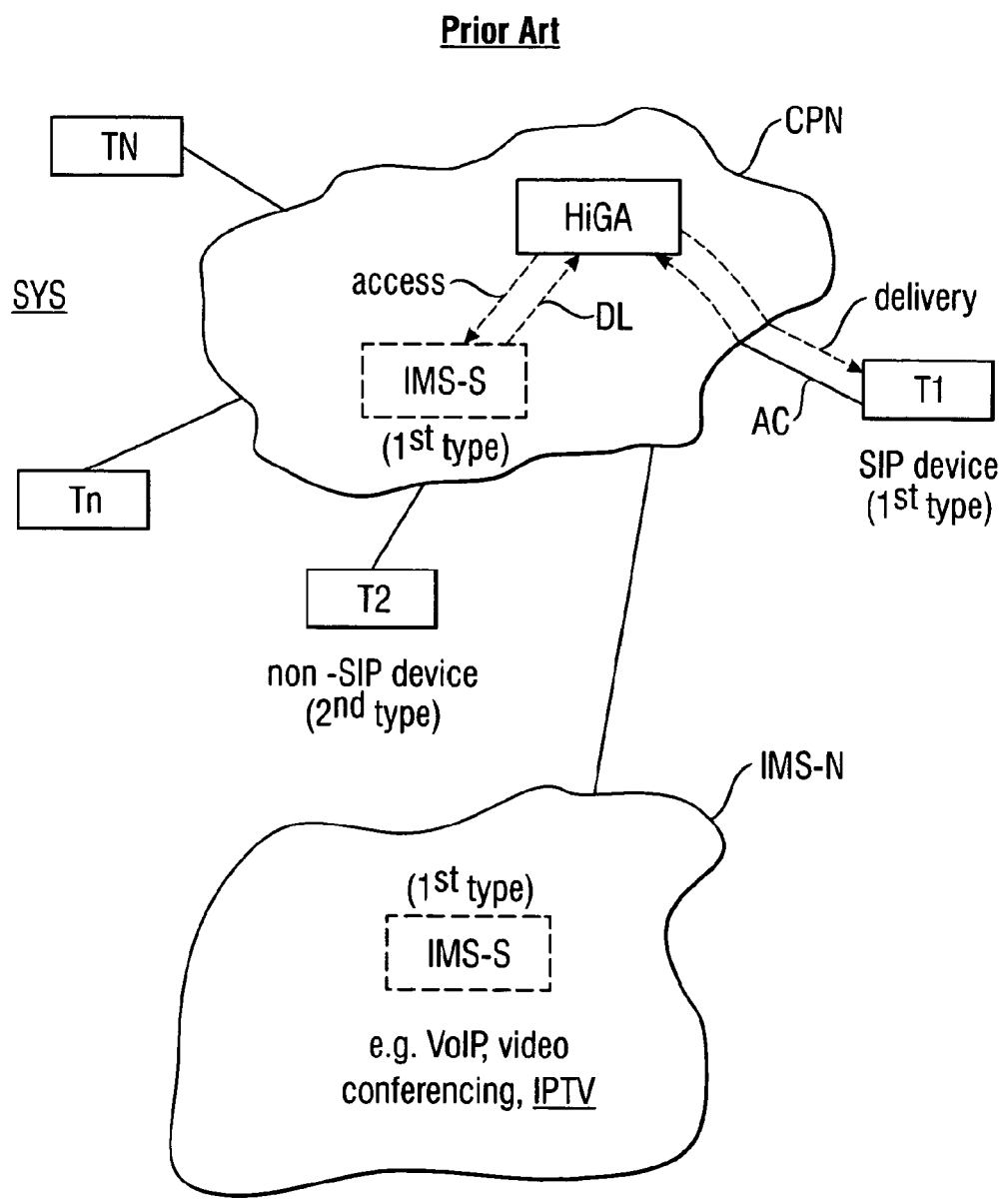
FIG. 1a is an overview of a communication system SYS in accordance with the prior art.

As shown in FIG. 2a, the service providing server IMS-S comprises a service memory SERM for storing one or more services SER1, SER2, SER3 to be provided to said terminal devices T1, T2, . . . Tn . . . TN. Although the server IMS-S is shown in FIG. 2a to be simply connected to the HiGA, the server IMS-S may also be located in a separate service provision network IMS-N, as shown in FIG. 1a. The service providing server IMS-S runs a control protocol IMS-CTRLP which is provided by a control protocol device. An example for the control protocol is SIP. This type of protocol will be referred to as the "first type" protocol which provides first type SIP control data CS "in association" with one or more services SERV. Each service in the service memory SERM may have its own control protocol, or a single control protocol can be provided for all services. The services may for example be an IPTV provision (MPEG2 stream provision), a VoIP service, video conferencing, IPTV, as already shown in FIG. 1a and described above. One control protocol may be SIP, however, also other control protocols can be used.

The meaning of "in association" may be understood with reference the example in FIG. 2b which is explained with further details below. Here, the service is IPTV and the control data (first type control data) are user-specific electronic program guides EPG1, EPG2, . . . EPGn. However, the control data or control information of the first type may simply be a trigger to run a specific service, the provision of an HTML page in connection with IPTV etc. Therefore, somehow the control protocol(s) are "associated" or related to the specific service or specific services. The services can either be provided directly to the second type terminal device T2 through a link DL or by means of an access network AC, as shown in FIG. 2a. Alternatively, there is also the possibility to route the service provision through the gateway apparatus HiGA itself.

In FIG. 2a, the terminal devices T1, T2, . . . Tn . . . TN comprise first type terminal devices T1, Tn and second type terminal devices T2, wherein said terminal devices T1, T2, . . . Tn . . . TN each comprise a service processor SP for processing the service SERV provided by said service providing server IMS-S through said access network AC or through said direct link DL. Whilst the first type terminal devices T1, Tn comprise a control protocol device of the first type providing first type control data in association with the execution of the service by said service processor SP to said gateway device HiGA, the second type terminal devices T2 comprise a control protocol device of a second type, different to said first type and providing second type control data in association with the execution of the service by said service processor SP to said gateway device HiGA. This means, that the first type terminal devices T1, Tn are capable of performing and communicating directly with the server IMS-S, as shown in FIG. 1c.

For example, the first type terminal devices T1, Tn may comprise the features of a user-identity which is one of the control data belonging to the first type control protocol. On the other hand, the second type terminal device may be a standard Set Top Box STB which simply comprises a service processor SP for running for example an MPEG2 stream. Thus, as such the second type terminal device will only understand some kind of control data of the second type, however, will be "blind" to any control information of the first type coming from the first type control protocol of the server IMS-S. This means, that the second type terminal device T2 does not understand any control information of the first type. For example, if the second terminal device T2 is simply a Set Top Box STB, it simply runs the TV service, however, it has not the capability of requesting or being provided with personalized electronic program guide as control data.

Although in FIG. 2a, the communication system SYS is illustrated with the gateway apparatus HiGA communicating with both the first and second type terminals T1, Tn & T2, respectively, it should be understood that the invention concentrates on those features necessary in the HiGA for communicating with the second type terminals T2, i.e. those which operate using a different protocol (device) to that used in the service providing server. For communication with the first type terminals, obviously the special features of the invention are not necessary since the first type terminals runs the same protocol as the service providing server.

Figure 1B:
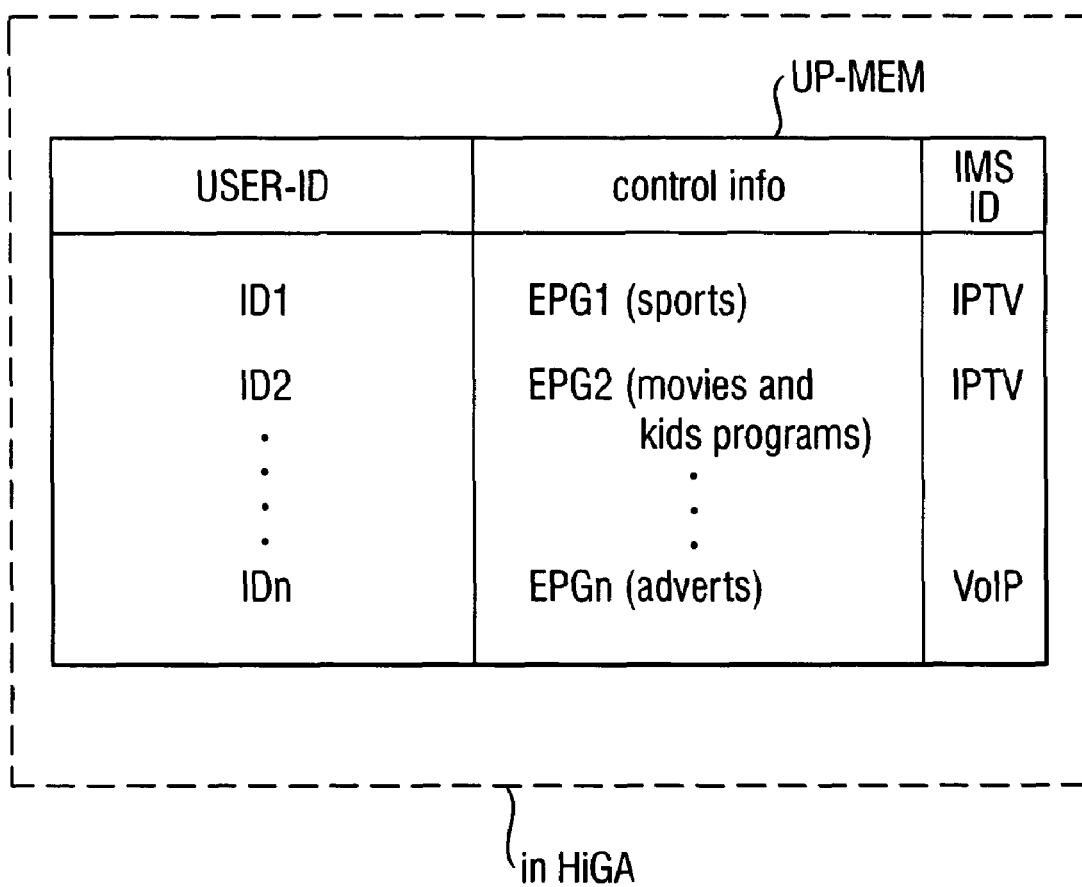
FIG. 1b shows a user profile in a user profile memory UP-MEM which lists specific preferences for specific required services in connection with a specific user ID, in accordance with the prior art.
Figure 1C:
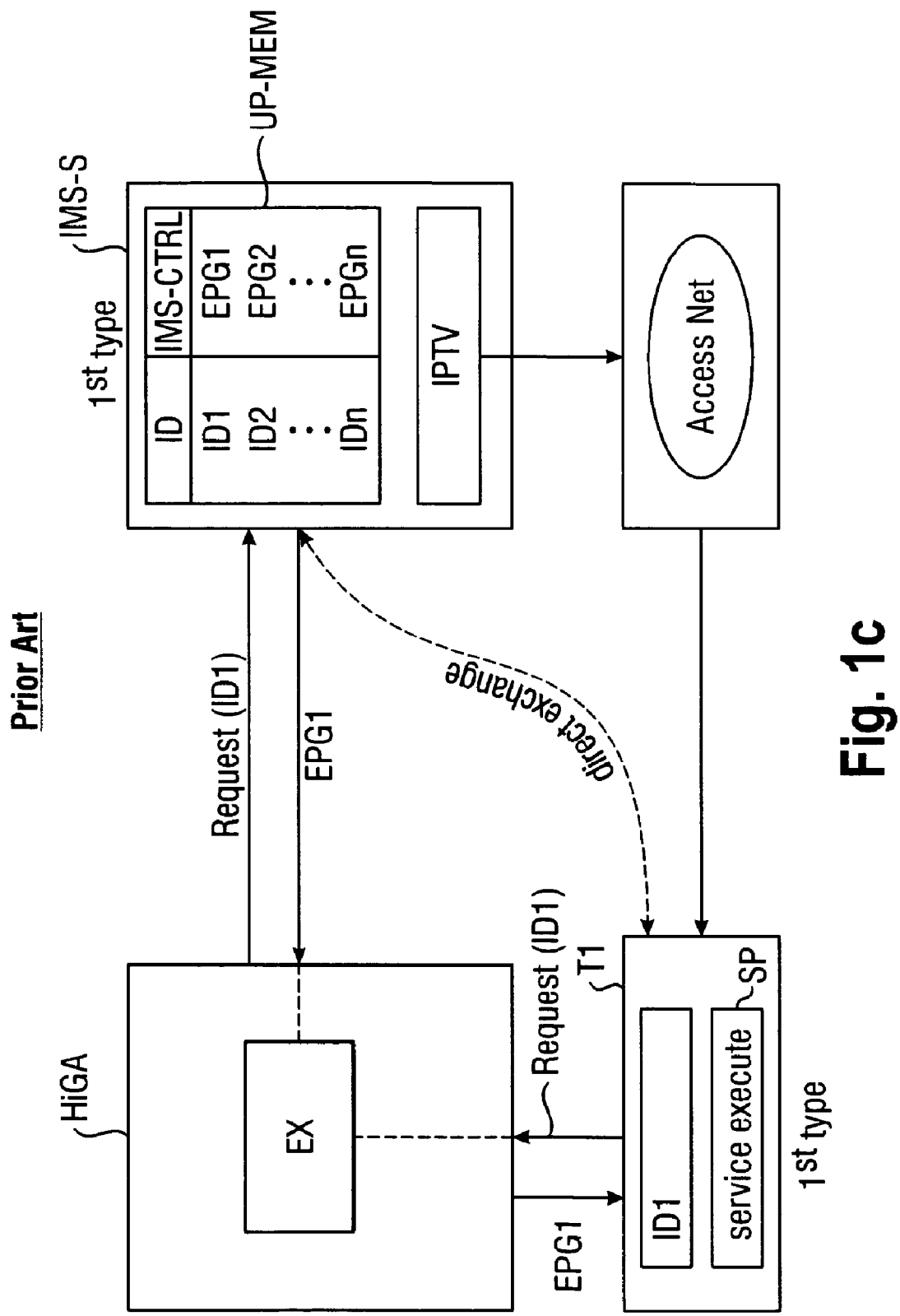
FIG. 1c shows a request scenario if a first type terminal device T1 requests personalized content in the form of a personalized electric program guide EPG1 from the server IMS-S, in accordance with the prior art.

The gateway apparatus HiGA is similarly arranged as in FIG. 1c or 1a, i.e. it acts as a kind of proxy between the server IMS-S and the terminal devices T1, Tn, T2. However, in accordance with the invention and as shown in FIG. 2a, the gateway apparatus HiGA comprises a kind of service abstraction layer between service-specific applications running on non-IMS home devices and the services provided by the IMS application servers. This application space AS of the gateway apparatus HiGA comprises one or more service-specific mapping devices AS-A. This kind of application space is intended to be a common application execution environment for different types of service-specific applications. The service-specific applications in the application space essentially adapt the service-specific control plane to the control plane native to the target second terminal devices T2. One can say that the application space is an environment where plug-ins supporting different devices (set of functions) and protocols are placed. Thus, for each of the services SERV to be provided by the server IMS-S, the gateway apparatus HiGA comprises a service-specific mapping device AS-A.

In FIG. 2a, as an example, an IPTV mapping device is indicated. Thus, the gateway device HiGA assumes support for application-specific logic based in the HiGA. The control plane is terminated in the gateway apparatus HiGA which has the function of mapping this to the native control plane of the second type terminal device T2. Hence, the gateway apparatus HiGA acts as the IPTV server proxy to the second terminal device T2. One could say, that the application space AS in the gateway apparatus HiGA is a place-holder for modules terminating application-specific data from the IMS IPTV AS in case of an IPTV application, as shown in FIG. 2a. As also shown in FIG. 2a, separately the media plane from the IMS content server IMS-S is terminated directly in the second terminal device T2, as explained before.

The gateway apparatus HiGA could functionally be located in a residential gateway or in a master STB(M STB). This allows for the existence of multiple STBs (slave STBs) in the home environment which are connected to one master device handling the IMS control plane on their behalf. Typically, considering an IPTV application environment, the second terminal device T2 may be a standard Set Top Box STB, and the gateway device HiGA may be located in the same home or in the residential gateway.

Preferably, the identity of the user may be pre-stored in a memory in HiGA and can thus be presented to the IMS server. For example, a general mobile phone card (UICC or Universal Integrated Circuit Card) with the user ID can be presented to the HiGA. This card could host a number of applications such as the USIM or the ISIM. Thus, the user identity may also be an IMSI which is a unique number associated with the mobile subscription and is part of the part of the USIM which runs on the "mobile phone card". Also a smart card may be inserted, just as in modern devices like a STB with a smart card. Furthermore and as shown in FIG. 1b, the HiGA may maintain a user profile in a user profile memory UP-MEM. Such a user profile may for example be stored in the exchange portion EX of the gateway device HiGA shown in FIG. 1c. A user profile may be maintained for every subscription which is linked to an IMS service identity. For example, as shown in FIG. 1b, each user identity (USER-ID) is associated with a specific preference (control information) and service identification IMS-ID. For example, different TV programs may be available to each individual user in their EPG (Electronic Program Guide) such as, as shown in FIG. 1b, ID1="dad"/control info="sports"; ID2="son"/control info="movies and kids programs" and IDn="mother"/control info="advertisements". IF such specific preferences (control info) are indicated, the HiGA will make sure that the requested service is delivered to the user (terminal device) in a personalised way by means of the control information.

Hereinafter, the application space AS with its service-specific mapping devices AS-A (one for each service to be provided) will be described with further details. As shown in FIG. 2a, the principal function of the mapping device AS-A is to exchange first type, e.g. SIP, control data with the service providing server IMS-S and to exchange second type, e.g. non-SIP, control data with said second type, e.g. non-SIP, terminal device T2. That is, the HiGA, acting as a proxy for the second terminal device T2, communicates with the server IMS-S using the first type server control protocol, and it communicates with the second terminal device T2 using the second type control data. An example should illustrate this.

Assume for example that the second terminal device T2 is a standard Set Top Box STB. It will have the capability to run for example an MPEG2 stream by means of a MPEG2 decoder in the service processor SP. It may also have a simple "first type" control protocol which may only comprise the making of a simple request to run or request an MPEG2 stream or an IPTV service. Furthermore, the STB can also receive a general electronic program guide EGP but it cannot receive it or request it in a user-specific manner. The user-specific functionality is taken over by the HiGA serving as a proxy for the STB. The HiGA can request and can be provided with user-specific control information, e.g. with a personalized electronic program guide EGP.

The "exchanging" of first type control data with the IMS-S server and second type control data with the second terminal device T2 also includes a correlation or mapping between the first type and second type control information. More specifically, the service-specific mapping device AS provides to the service providing server IMS-S first type SIP control data on the basis of second type, i.e. non-SIP, control data received from said second type terminal device T2, and it receives first type control data from said first type control protocol device IMS-CTRLP. In turn, the service-specific mapping device AS-A provides to said second type terminal device T2 second type, i.e. non-SIP, control data on the basis of said first type control data received from said service-providing server IMS-S, and it receives the second type control data from said second type control protocol device TD-CP of the second terminal device T2.

Thus, one can say that in the upward direction, i.e. terminal device T2→IMS-S server, the first type control data provided by the HiGA is based on second type control data received from the terminal device T2. In turn, in the "downward" direction, e.g. from the server IMS-S to the second terminal device T2, the second type control data provided by the HiGA device to the second terminal device T2 is based on the received first type control data from the server IMS-S. This relating—i.e. "on the basis"—or correlation of control data of the first and second type, performed by the gateway apparatus HiGA, can be considered to be a kind of "mapping", and therefore the device AS-A and the gateway device HiGA is denoted as "mapping device". Two simple examples in FIG. 2b and FIG. 2c will further highlight the "mapping" function for the control plane adaptation.

FIG. 3 shows a flowchart of an embodiment in accordance with the communication method of the invention, using a gate apparatus HiGA in a home network as explained above with reference to FIG. 2a. As illustrated in the flowchart in FIG. 3, generally the application space within the HiGA exchanges control messages 1CD of the first type between the server side IMS-S and the gateway apparatus HiGA whilst the second type control messages 2CD are exchanged between the second type terminal device T2 and the gateway apparatus HiGA.

In particular, as shown with step 1: $2CD_1$, a control message may be issued from the second type terminal device T2 to the HiGA. It is received in the HiGA and an associated (mapped) request message of a first type in step 2: $1CD_1$ is sent from the HiGA to the server side IMS-S. This message $1CD_1$ is—as explained above—based on the request message $2CD_1$. For example, as will be explained below, the control message may have its control format or control type adapted or converted (see e.g. the EGP conversion of the EGP format in FIG. 4a).

Likewise, when sending a control message in step 3: $1CD_2$ of the first type from the IMS-S server side to the HiGA, a corresponding or associated message in step 4: $2CD_2$ which is based on the first message $1CD_2$ can be provided to the second terminal device T2. Thus, the respective messages 1CD of the first type between the server side IMS-S and the HiGA are respectively based on messages 2CD of the second type between HiGA and the second terminal device T2.

As explained above with reference to FIG. 2a, the provision of the HiGA, in particular the provision of proxy applications (service-specific mapping devices) relating to specific services in the HiGA, enables standard off-the-shelf terminal devices T2 of the second type to assume a functionality which would normally only be capable to be carried out by first type terminal devices.

Figure 2B:
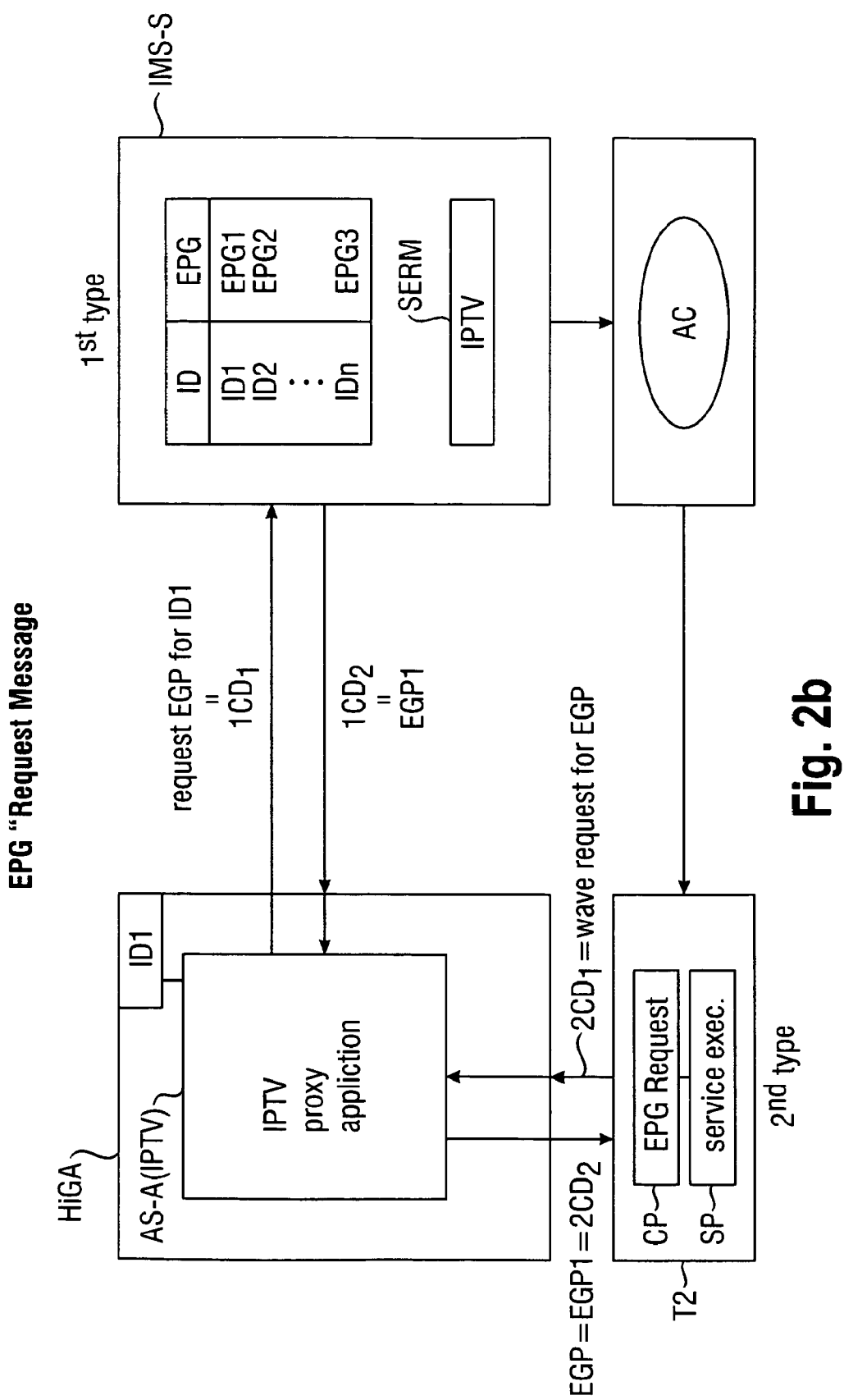
FIG. 2b shows a first specific service provision example for the provision of IPTV in connection with a personalized electric program guide EPG.

The example in FIG. 2b relates to the example shown in FIG. 1c which is the illustration of first terminal devices communicating with a first type server IMS-S. Just as in FIG. 1c, FIG. 2b comprises as an example service the IPTV service in the IMS-S server. It also comprises as first type control information the example of personalized electronic program guides EPG1, EPG2, EPG3 associated with user identities ID1, ID2, . . . IDn. Since the gateway apparatus HiGA is for example installed in the home of a user or has a user-plug-in with an identity ID1, the gateway apparatus HiGA, more specifically the service-specific mapping device running an IPTV proxy application AS-A(IPTV), can provide user-specific requests (control information) to the server IMS-S.

In the terminal device T2 there is a service processor SP for executing the IPTV service and an EPG request device CP which simply outputs a request for an EGP to the gateway apparatus HiGA as a request message $2CD_1$. Thus, the terminal device T2 can make a request for an electronic program guide EGP and will be provided with some EGP information in the return message $2CD_2$. However, the terminal device T2—being "blind" to user-personalized control data—will simply accept the electronic program guide EGP without knowing that it has been personalized by the intermediary (proxy) of the mapping device running the IPTV proxy application AS-A(IPTV). That is, after receiving a request message for EGP, the mapping device running the IPTV proxy application AS-A(IPTV) generates a request for personalized EGP information for the user with the user-ID ID1 by sending a request message $1CD_1$ including the user-identity ID1 inserted from the gateway apparatus HiGA or from the user-specific plug-in. Thus, one can say that the request message $1CD_1$ (a control information request message) is "based" on the request message $1CD_1$ because it generally still relates to the requesting of EGP information, only in a more user-specific way having been upgraded or supplemented with the user-identity ID1.

On the basis of $1CD_1$ the server IMS-S will return user-personalized electronic program guide information EGP1 in the return message $1CD_2$. Although the second terminal device T2 does not know that the electronic program guide information EGP which is returned in the return message $2CD_2$ is a user-specific electronic program guide information EGP1, in fact the electronic program guide information which is provided to T2 is indeed user-personalized because it has been requested in a user-personalized way from the HiGA proxy to the IMS-S server and it has been returned in a user-specific way to the HiGA. Thus, the return information EGP1 in the return message $2CD_2$ is also "based" or "correlated", i.e. mapped, from the return message $1CD_2$ containing the electronic program guide EGP1. Thus, the communication scenario in FIG. 2b comprises the exchange of first type and second type control information which are respectively "based" on each other.

FIG. 2c shows another example of the "mapping function" of the mapping device for the example of an MPEG2 service stream provision. In FIG. 2c an MPEG2 stream is decoded by an MPEG2 decoder in the service processor SP. In FIG. 2c the return messages $2CD_2$ and $1CD_2$ merely extend to the provision of an acknowledgement ACK. However, as shown in FIG. 2c, the protocols run by the second terminal device T2 and by the IMS-S server are different, i.e. the request message $2CD_1$ for having an MPEG2 service provided by the service provider IMS-S is a HTTP or RTSP request whilst the request issued by the gateway apparatus HiGA is a SIP request in the message $1CD_1$. Thus, also in FIG. 2c, the request message $1CD_1$ is "based" on the HTTP request in the message $2CD_1$. Likewise, the return message $1CD_2$ (a simple acknowledgement ACK) is a SIP acknowledgement message and the acknowledgement message $2CD_2$ being a HTTP acknowledgement message, is "based" on the SIP acknowledgement message $1CD_2$. Thus, in this case the mapping device running e.g. the IPTV proxy application AS-A(MPEG2) simply "maps" request and acknowledgement messages between the different control planes of the server IMS-S and the second terminal device T2.

FIG. 2c also shows another example in which the service-specific mapping device runs a proxy application in order to negotiate the request for resources with the server IMS-S if a request for a specific service provision is made by the second type HTTP terminal device T2. The example is for the case, when accessing a VoD (Video on Demand) service and the second terminal T2 is constituted by a set-top-box STB. The set-top-box STB (as indicated with the brackets in FIG. 2c) has initiated a media session with a VoD server using an RTSP protocol. As indicated in FIG. 1c or in FIG. 2a, the actual video streaming may be provided through a direct line DL or through the access network AC. An important aspect is that the access network should have enough resources RES (e.g. bandwidth) to deliver the requested stream to the set-top-box. A general feature of the server IMS-S is that it is able to negotiate the resources RES required by the end device and the resources RES available in the access network AC. Hence, the IMS-S server generally allows for QoS provisioning (QoS=Quality of Service). However, as explained with reference to the prior art FIGS. 1a, 1b, 1c, an off-the-shelf set-top-box STB does not have the capability to negotiate such resources RES with the IMS-S server.

However, as shown in FIG. 2c, if the gateway apparatus HiGA comprises a services specific mapping device running an RTSP proxy application AS-A(RTSP), then off-the-shelf-devices having no knowledge of QoS are enabled to request QoS parameters in a network that has a QoS reservation system. A simply example is that the user would like to watch a high definition movie, i.e. a HDTV movie that requires 5 Mbsp bandwidth. If the access network AS only provides 3 Mbps, then there is a problem, because simply the high definition movie is not capable to be provided to the user having the off-the-shelf set-top-box STB.

Whilst the RTSP proxy in the application space of HiGA does no resource reservation/allocation, the reservation is actually done by the resource manager entity in the network on request from the IMS-AS. The IMS-AS is in turn asked by the IMS IPTV client in the HiGA which is triggered by the RTSP proxy. The IMS IPTV client is really the entity in the HiGA which supports SIP and which is "aware" of the IPTV service. It therefore constitutes a true HiGA functionality. Hence, using an RTSP client (in the device)→an RTSP proxy (sitting in the application space of HiGA)→an IMS IPTV application (core HiGA functionality)→an IMS AS→access network resources manager in the mentioned order, it is possible to negotiate in advance the requirements of the user's stream and capabilities of the access network AC and then either allow the stream when there are enough resources RES or to disallow the stream when there are not enough resources RES.

On the other hand, it should be noted that the RTSP proxy itself is really at the end of the above mentioned order and it does not do a resource reservation by itself. The resource reservation is done by the IMS AS (in conjunction with the other mentioned network components) when it gets a request from the IMS IPTV application in the device. The RTSP proxy just passes the RTSP requests from the client to the IMS IPTV application. Further details are explained below with reference to the preferred example "TRIGGERS FOR PERSONALIZED CONTENT".

Summarizing, in FIG. 2c the second type control data $2CD_1$ constitute a simple service request for the video streaming provision and this request $2CD_1$ is provided to the RTSP proxy application AS-A (RTSP). The RTSP proxy application can then initiate an enquiry/request message $1CD_1$ to the server IMS-S to enquiry whether there are sufficient resources in the access network AS to provide the requested service (video stream) to the second type terminal device STB. The server IMS-S-in response to receiving the request/enquiry message $1CD_1$ can then negotiate or check with the access system AC whether there are sufficient resources RES for the service provision. If there are sufficient resources, an acknowledgement message $1CD_2$=ACK is sent back to the RTSP proxy application in HiGA and if there are no sufficient resources found, then a non-acknowledgement message $1CD_2$=NACK is provided to the RTSP proxy application. Corresponding acknowledgement/non-acknowledgement (ACK/NACK) messages are then provided from the RTSP proxy application to the set-top-box STP. First the RTSP proxy application can check and reserve the required bandwidth (resources RES) for the service provision although the off-the-shelf-set-top-box STP can only send a general request message for the service provision. Thus, on a user-specific basis (because the RTSP proxy application can personalize the request from the set-top-box (STB) with the user identity known in HiGA), it is not only possible to simply reject or allow the video streaming provision but it is also possible e.g. to allow the video service provision with a smaller bandwidth, i.e. with a lower QoS. Thus, the gateway apparatus HiGA performs and allows a user-specific negotiation of QoS with the server IMS-S. For example, the user may also only have paid for a certain bandwidth on the access network AC and the gateway apparatus HiGA with its RTSP proxy application can "tailor" the video service provision to a QoS for which the user has paid.

As illustrated with the examples in FIG. 2b and FIG. 2c and with the general block diagram of the communication system SYS in FIG. 2a and the communication method in FIG. 3, it may be understood that due to the invention also conventional second type terminal devices T2 can be provided with first type control information through the intermediary of the HiGA proxy. In this manner, user-specific, i.e. personalized, content data can also be provided to simple standard second terminal devices T2.

Hereinafter, a special embodiment of the invention in connection with the case of IPTV is described with reference to FIG. 2d and also with reference to FIGS. 4a, 4b, 4c, 4d and 4e.

Figure 2D:
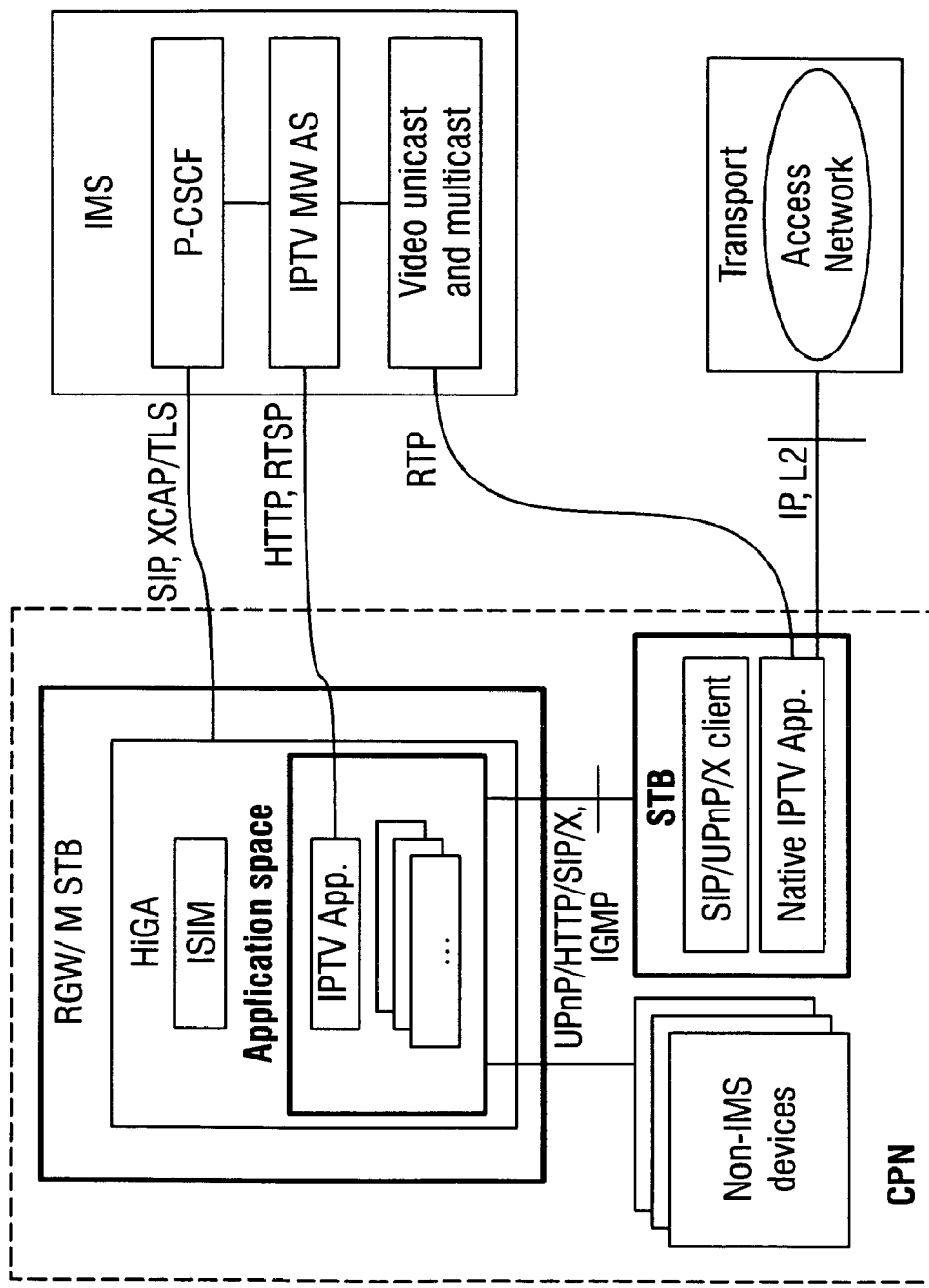
FIG. 2d shows a block diagram of a communication system SYS and a gateway device HiGA for the specific case of an IMS server and an IPTV service provision.

FIG. 2d is essentially corresponding to FIG. 2a for the specific case of an IPTV service application. In FIG. 2d is shown an application space and service-specific applications within it, as well as a set of non-IMS devices which can access IMS services via the HiGA. An example of the IMS service is the IPTV service. The interactions between a non-IMS STB (second terminal device), an IPTV service application in the HiGA application space (a mapping device) and the IMS IPTV AS are illustrated in FIGS. 4a, 4b, 4c, 4d, 4e. These Figs. illustrate signalling diagrams which are specific to the IPTV service and are illustrated here as an example of a service implementation. Whilst some of the messages are standard in a HiGA implementation, special messages will be highlighted to illustrate the features of the invention in the HiGA application space with an IPTV application introduced. For other IMS services and non-IMS services the sequence diagrams in FIG. 4a, 4b, 4c, 4d, 4e would be similar, depending on the application (service) to be provided.

As shown in FIG. 2d, the HiGA with an application space assumes support for application-specific logic located in the HiGA. The control plane is once again terminated in HiGA which has the task of mapping this to the native control plane of the STB by means of the mapping devices. Hence, the HiGA, as explained before, acts again as the IPTV server proxy to the STBs. The application space in HiGA thus is a place-holder for modules terminating application-specific data from the IMS IPTV AS. Again, as in FIG. 2a, the media plane from the IMS content server IMS-S is terminated in the STB.

As explained above, the HiGA functionality could be located in a residential gateway or in a master STB (M STB). This allows for the existence of multiple STBs (slave STBs) in the home environment which are connected to one master device handling IMS control plane on their behalf.

It may be noted that all the diagrams in FIG. 4a-4e relate to a preferred mode of the invention but are by no means to be considered as limiting the scope of the invention because the main scope of the invention is shown with the diagrams in FIG. 2a and FIG. 3

Figure 4A:
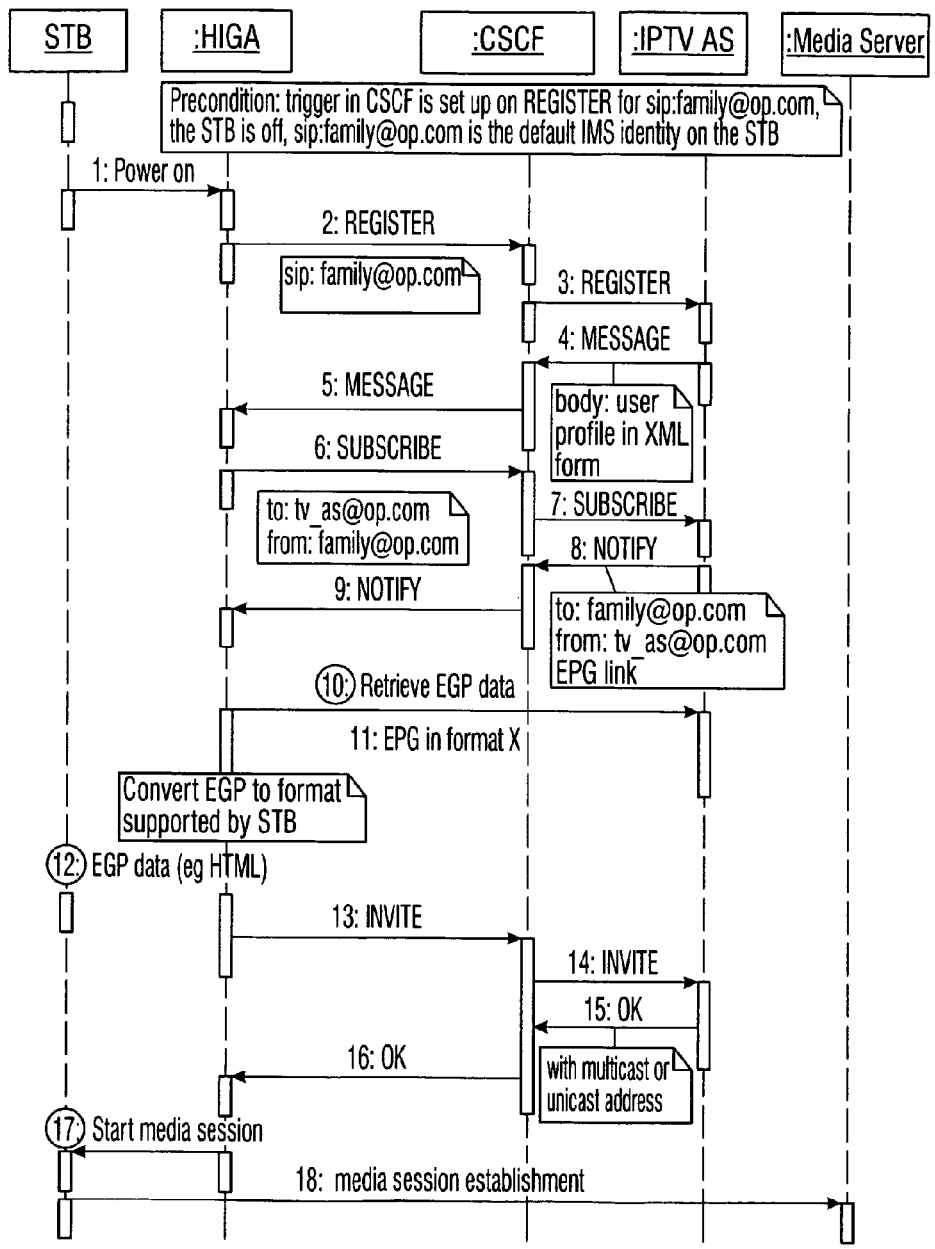
FIG. 4a shows an example flow chart of the media session initialisation in the STB in connection with the IPTV service.

The media-session initialisation in the STB is shown in FIG. 4a. It should be noted, that in FIG. 4a there are messages which partially are incorporated already in a conventional gateway apparatus HiGA. The new messages in accordance with the preferred mode of the invention are respectively encircled in FIG. 4a (and also in the other flowcharts of FIGS. 4b-4e, to be explained hereinafter). FIG. 4a is more detailed embodiment of the invention relating to the EPG download in FIG. 2b.

In FIG. 4a, the "media server" on the right hand side corresponds to the IMS-S server shown on the right hand side in FIG. 2a. The set-top-box STB corresponds to the second type terminal device T2. The ":HGA"/:CSCF (call/session control function) are located in the gateway apparatus HiGA. The ":IPTV AS" corresponds to the application space in the IMS server.

The precondition in FIG. 4a is that a trigger in :CSCF is set up on REGISTER for sip:family@op.co and the STB is off; sip:family@op.com is the default IMS identiy on the set-top-box STB. The media session initialization in the set-top-box STB in FIG. 4a starts with message 1: Power on which is sent from the STB to the HiGA. With the message 2: REGISTER, the HiGA registers with the family identity. This step 2: involves the HiGA registering the set-top-box STB to the application space AS. Step 2: is a conventional message as e.g. defined in "Rechon Architecture Report, EAB-05: 045608, 2005-12-22.

In step 3: a registration request is relayed to the application space based on prior established triggers. In step 4: the application space AS responds with a step 4: MESSAGE message containing the user profile. Step 5: sends the MESSAGE to the HiGA. Now, based on the received user profile, the gateway apparatus HiGA performs a subscription in step 6: SUBSCRIBE to the application space AS. In step 7: SUBSCRIBE the subscribe message is relayed to the application space AS. In step 8: the application space: IPTV AS responds with a NOTIFY message containing a URL to the EPG for the corresponding user profile. In step 9: NOTIFY, the NOTIFY-message containing the URL is relayed to the gateway apparatus HiGA. So far, steps 1: to 9: are conventional in as far an off-the-shelf second terminal device T2 can also execute such steps in order to receive a URL to an EPG for a corresponding user profile.

In accordance with the invention, in step 10: the gateway apparatus :HiGA sends a message 10: Retrieve EGP data message to the :IPTV AS application space. Thus, in step 10: the IPTV application :IPTV AS in the application space retrieves the EPG from the location specified in the received URL. In step 11: EPG in format X, the EPG data which has been retrieved from the URL is received in a format normally not supported by the set-top-box STB, i.e. essentially the EPG is in a control data format of the first type (see also FIG. 2b). Therefore, in step 10, the gateway apparatus :HiGA converts the EPG to a format of a second type which is supported by the set-top-box STB. This is done, because the EPG is normally not necessarily in the same format as supported by the set-top-box STB. That is, the EPG format is converted to a format supported by the STB, e.g. into an HTML format. In step 12: the converted EPG data in the second control data type (e.g. HTML) is relayed to the set-top-box STB. In this manner, the off-the-shelf-set-top-box STB can receive a personalized electronic program guide EPG.

In step 13: INVITE, an INVITE message is sent by the HiGA containing the SDP which would be used to allocate network resources for the media stream in the transport network. After step 12: i.e. after download of the EPG, :HiGA can perform a resource negotiation, as in principle shown in FIG. 2c. Thus, :HiGA can first reserve in the access network AC a certain maximum bandwidth, e.g. a 5 MB line. Then, the user at the STB can select the stream channel as request to the IMS server, e.g. the user can request a HDTV channel. If the access network AC cannot provide the line, HiGA will return the message NACK saying that the access network AC cannot provide the line (see also FIG. 2c). HiGA can also negotiate in the message to better try another stream or to do the streaming with a channel of lower resolution.

In step 14: an invite message INVITE is relayed to the CSCF (Call/Session Control Function). In step 15: an OK message containing a unicast or multicast address is returned by the application space :IPTV AS. In step 16: the OK Message is relayed from the :CSCF to the :HiGA.

Figure 4B:
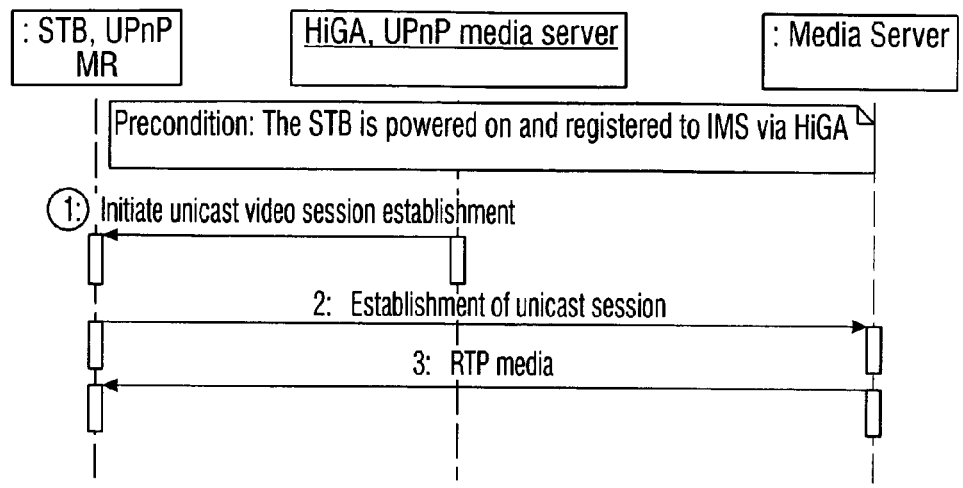
FIG. 4b shows an example flow chart of a unicast session establishment in connection with the IPTV service.
Figure 4C:
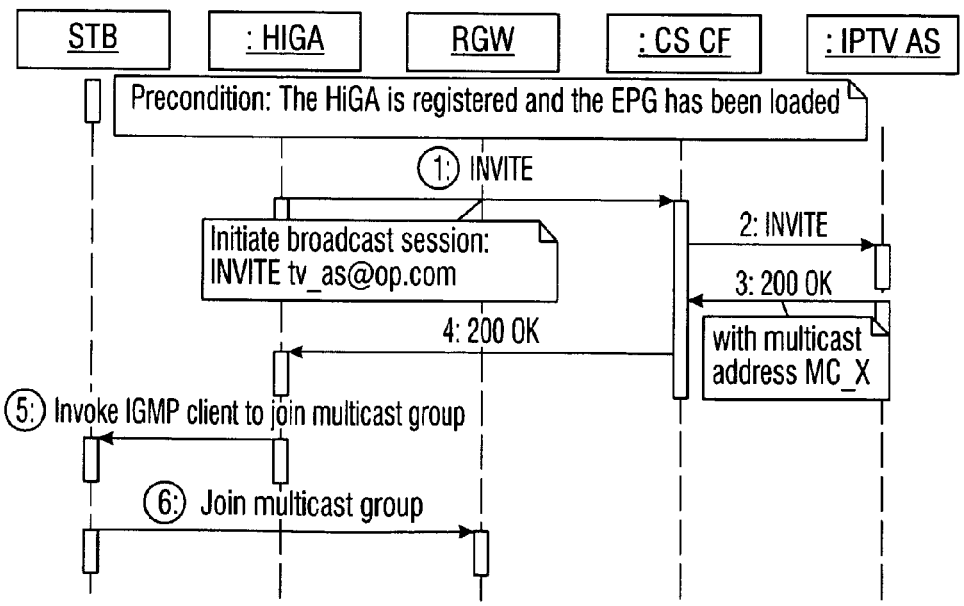
FIG. 4c shows an example flow chart of a multicast session establishment in connection with the IPTV service.

Step 17: Start media session is an important message which is not supported in conventional systems. In step 17: the :IPTV application space in HiGA invokes a media seesion establishment between the set-top-box STB and the service provision device (the media server). This message is an important message because the :HiGA can actively control and initiate a media session establishment in step 17: FIGS. 4b, 4c show further preferred details of this.

In step 18: media session establishment, a media session is established between the STB and the media server IMS-S in a conventional way, e.g. through a direct line DL or through an access network AC, as shown in FIG. 2a.

Thus, since the :HiGA performs the registration on a user-specific basis (see the first block in FIG. 4a), it is possible to retrieve a user-specific electronic program guide EPG from the :IPTV AS and this specific electronic program guide EPG can be relayed to an off-the-shelf STB after having been converted before step 12:. Thereafter, the media session establishment can be triggered. Thus, control data (electronic program guide EPG) can be provided to the set-top-box in a user-personalized way, something that an off-the-shelf set-top-box STB is normally not capable of doing.

FIG. 4b shows a unicast session establishment using an UPnP protocol as illustration of the step 17: start media session in FIG. 4a. The precondition in FIG. 4b is that the STB is powered on and registered at the server IMS via HiGA, i.e. that steps 1: to 9: in FIG. 4a have been carried out beforehand. In FIG. 4b the media server on the right hand side corresponds to the service SERV stored in the services memory SERM of the server IMS-S shown in FIG. 2a. The HiGA and the UPnP media server are co-located in the HiGA shown in FIG. 2a. The STB on the left hand side in FIG. 4b corresponds to the second terminal T2 shown in FIG. 2a.

In step 1: in FIG. 4b, the UPnP server is co-located with the IPTV application in the HiGA application space and invokes the set-top-box STB to initiate a media session passing the URL of the video content located in the media server. The UPnP AV architecture could preferably be used here, in particular the asynchronous push model described in section 6.5 of "UPnP AV architecture 0.83".

In step 2: there is an establishment of a unicast session which means that the STB's UPnP media renderer establishes a unicast stream with the media server on the right hand side. Similarly as in FIG. 2c, this can be done by a RTSP protocol. In step 3: the RTP media stream is sent to the STB from the media server. In this scenario, the native application in the set-top-box STB could preferably be the UPnP media renderer device described in "UPnP AV architecture 0.83".

As mentioned in the important step 1: the set-top-box STB is invoked to initiate a media session in which the URL of the video content located in the media server is passed. Thus, an active control of the STB from the :HiGA can be performed.

In contrast to FIG. 4b, FIG. 4c shows a multicast session establishment which can be used in step 17: in FIG. 4a. In addition to the units shown in FIG. 4a, FIG. 4c also shows a residential gateway RGW located between the gateway apparatus HiGA and the :CSCF (Call/Session Control Function). Similarly, as in FIG. 4b, FIG. 4c is based on the pre-condition that the :HiGA is registered and the EPG has been downloaded by the STB.

The important message 1: INVITE in accordance with the invention comprises that the IPTV application in the HiGA sends out an INVITE message to the CSCF requesting to receive a multicasted channel (e.g. a broadcasted TV channel). Thus, in accordance with the invention, the :HiGA can actively send a first type request message to the :CSCF requesting to receive a specific multicasted channel. Essentially, step 1: INVITE is to initiate a broadcast session, e.g. INVITE tv_as@op.com.

In step 2: the INVITE message is relayed to the IPTV application space :IPTV AS by the :CSCF. In step 3: the application space AS in the server IMS-S replies with an OK message containing a multicast address (e.g. 200) for the multicast group containing the video stream of the TV channel. This multicast address is denoted in step 3: with MC_X. In step 4: the OK message is transmitted to the gateway apparatus HiGA. Steps 2: to 4: are conventional messages in order to relay a request message to the server and to respond to such a message by the server.

In accordance with the invention, in step 5: the IPTV application space in the HiGA application space invokes the IGMP client in the set-top-box STB to join the multicast group. Further, in accordance with the invention, in step 6: the IGMP client in the set-top-box-STB joins the new multicast group by sending an IGMP JOIN message to the residential gateway RGW which transmits it to the IGMP aware access node of the transport (access) network.

Messages 1:, 5:, 6: in FIG. 4c allow the STB to be controlled with second type control data in such a manner that it can join a specific multicast group on a multicasted channel (e.g. a broadcasted TV cannel). Hence, the :HiGA performs the "negotiation" with the server :IPTV AS for a multicasted channel and can then, after receiving OK message in step 4: send corresponding control data of the second type to the set-top-box STB to invoke an IGMP client to joint the multicast group. Such negotiation is not possible with off-the-shelf set-top-boxes STB.

Figure 4D:
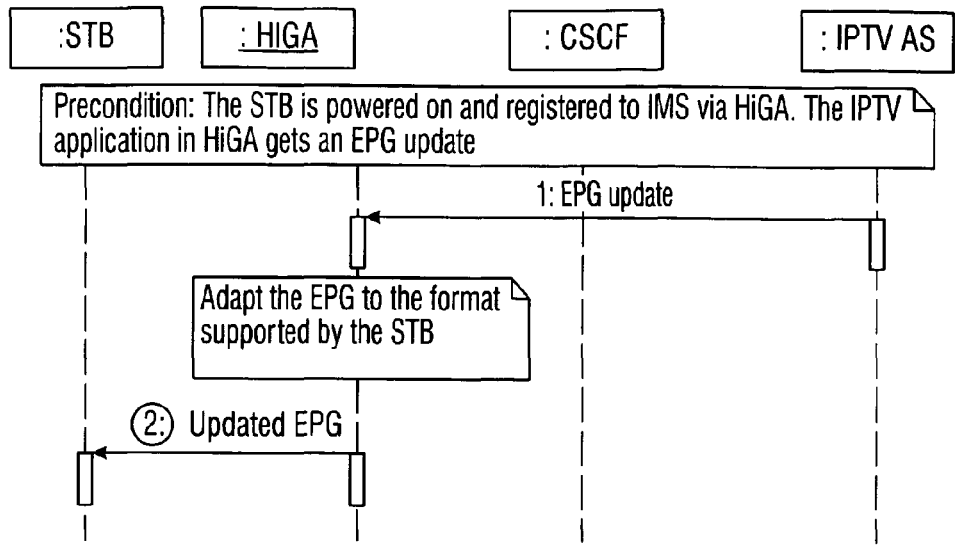
FIG. 4d shows an example flow chart for EPG updates in connection with the IPTV service.

FIG. 4d shows an example of sending control data from the server to the set-top-box STB in order to update an electronic program guide EPG. The precondition in FIG. 4d is that the set-top-box STB is powered on and registered at the INS server via HiGA (essentially that the steps 1: to 6: in FIG. 4a have been carried out). The purpose in FIG. 4d is essentially that the IPTV application in :HiGA gets an EPG update, as one example of having control data in the STB updated. However, it is understood that also other kind of control data could be updated is very much the same manner.

Step 1: is a conventional message in which the server side IPTV AS sends an EPG update message to the :HiGA. The IPTV client (IPTV proxy application) in the HiGA receives the EPG and the EPG is adapted to the format supported by the STB. Already this conversion of the EPG is—as explained with reference to FIG. 4a, step 12: —part of a new message in accordance with the invention.

In step 2: in FIG. 4d, the IPTV proxy application (client) in the :HiGA sends EPG updates to the set-top-box STB. This step is an implementation specific to the EPG model supported by the set-top-box STB. Alternative and preferred modes include the sending of the entire EPG file or just the changes down to the STB. However, what is important is—similarly to FIG. 2b—that control data in terms of an electronic program guide EPG is exchanged in a first type format between the server :IPTV AS and the :HiGA and the set-top box STB is made to understand this update by having it converted in the :HiGA to a format which is supported by the STB.

Thus, whilst off-the-shelf STBs can only receive a general user-unspecific EPG and no changes, the communication system SYS of the present invention allows to download a personalized (user) specific EPG, as well as changes, thereof to the off-the-shelf STB.

As explained in the above numerous examples of FIGS. 4a-4e, the IPTV proxy application (client) in the HiGA application space takes over functionalities and conversion functions which are normally not possible by an off-the-shelf STB. One could also say, that the HiGA acts as a kind of front-end for a conventional STB to carry out functions which "modern" STBs can carry out themselves.

Figure 4E:
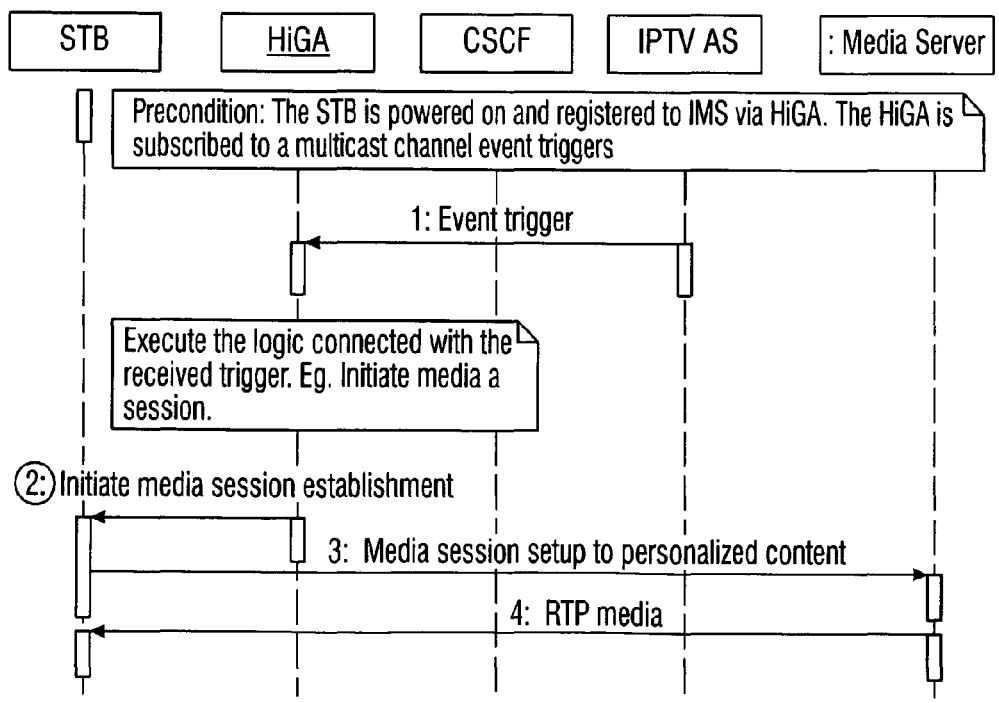
FIG. 4e shows example triggers for personalised content in connection with the IPTV service.

Another important scenario is how personalized content can be delivered to the STB with the help of the IPTV proxy application (client) in the :HiGA application space, as is essentially illustrated with FIG. 4e. An example of a personalized content is an advertisement tailored to the user's preference or the user profile. This advertisement would be shown to the user during commercial breaks. Thus, similarly as having downloaded and converted a personalized electronic program guide EPG, the scenario in FIG. 4e relates to the provision of personalized content to the off-the-shelf STB.

In FIG. 4e, the positioning and arrangement of the units :STB, :HiGA, :CSCF, :IPTV AS and :media server correspond to the respective units in FIG. 4a. The precondition in FIG. 4e is that the STB is powered on and registered to the server IMS via :HiGA. The :HiGA is subscribed to the multicast channel event triggers to understand trigger events being sent from the server side.

As shown in FIG. 4e, in step 1: Event trigger, an event trigger is received by the HiGA. This could be a trigger for an event, such as the start of a commercial, an interactivity trigger for routing etc. Of course, eventually the purpose of the event trigger in step 1: is to bring about the invocation of a particular action in the set-top-box STB. This event trigger (of first type control data, see FIG. 2a) is converted by the HiGA into the second type control data to be understood by the off-the-shelf set-top-box STB. Generally, the basic function of an event trigger is to bring about the invocation of a particular action in the STB. In the example of FIG. 4e, of course, the purpose of the event trigger is to inform the STB to start a media-session—which is a commercial. That is, of course, the eventual desire is that the STB starts a media session with the server side in order to be connected with the commercial or advertisement in a personalized way.

Therefore, in step 2: a media session establishment is initiated in which, based on the URL in the trigger, the IPTV application (proxy application) in the HiGA invokes a media session establishment in the set-top-box STB. This media session establishment is shown with FIGS. 4b, 4c depending on whether a unicast session or a multicast session is to be established.

It may turn out that establishing unicast sessions (FIG. 4b) for delivering personalized content may be too expensive from the point of view of network resources in the access transport network AC. For this reason, personalized content, such as advertisements, could be pre-cached in the CPN (Customer Premises Network), e.g. in the STB itself or in a NAS (Network Attached Storage) controlled by the operator. In this case, the media server in steps 3:, 4: in FIG. 4e will be the CPN entity with pre-cashed content (e.g. STB or NAS).

Since the :HiGA personalizes the messages due to the registration process (and due to having the user identities stored in it), it can be achieved that user-personalized commercials will be provided to the STB in the actual media session because the HiGA performs a filtering of what kind of event trigger is received in order to check whether the commercial (event trigger initiation) is for a specific user identity or not. Only if it is for a specific pre-registered user identity it will invoke the media session for this commercial in the STB. In this manner, personalized content, e.g. a commercial, can be provided in a user-personalized way to the STB. In contrast to this, using conventional off-the-shelf set-top-boxes, everybody would have to watch the same advert in an advertisement break. That is, in accordance with the invention, HiGA will receive a trigger if a specific previously agreed URL is about to transmit a specific commercial stream. In the HiGA, the URL is associated with the user-ID and therefore, HiGA only provides control data of first type, indicating the provision of a specific commercial on the server side, to the STB if the commercial is about to be sent and a user-ID has indicated interest in it beforehand. If so, then a media session setup is performed for this video asset.

For the invocation of VoD streams, a SIP INVITE message could be sent to the IPTV AS. To achieve this, the IPTV application in the STB could send a message over one of the alternative protocols (z. B. UPnP, HTTP, SIP etc.) to the HiGA and HiGA would in turn initiate the relevant SIP dialogue with the IPTV AS in the server. The final message in the dialogue carrying the SDP could trigger the resource management system to reserve resources RES in the access transport network AC in accordance with the bandwidth requirements of the negotiated media session. Essentially, the resource negotiation would take place as outlined with the example in FIG. 2c.

Having configured the communication system SYS, in particular the gateway apparatus HiGA, as shown in the block diagram in FIG. 2a and in the flow chart in FIG. 3, in particular having configured the gateway apparatus HiGA as shown in FIG. 2a to include service-specific mapping devices as a kind of proxy application for the off-the-self set-top-box STB, the gateway apparatus HiGA can provide access to e.g. IMS based services for different types of non-IMS aware home devices, such as the STB, by the introduction of the relevant applications in the application space AS of the HiGA which adapt, convert and interpret the service control plane of the service providing device IMS-S to the control protocols of the second terminal device T2. This invention, therefore, resolves the issue of incompatibility between non-IMS devices and IMS-based services and hence opens the way for operators to provide their multimedia services over IMS to a variety of standard, off-the-shelf home devices.

One aspect, as shown in FIG. 2b and in FIGS. 4a-4e, is relating to the IPTV support in the HiGA application space to allow the standard STB to maintain its original functionality without having to be aware of the IMS IPTV AS in the server. Hence, the standard STB can be a generic media terminating device, i.e. general second type terminal device, which can be purchased off-the-shelf.

Furthermore, the application space proxy in the HiGA allows the HiGA to be easily upgraded. New versions of service applications or updates to existing ones can be downloaded to the application space AS in the HiGA. This adds flexibility to the HiGA in terms of functionality and enables the service providers to remotely manage the HiGA.

The above general embodiments of the invention in FIGS. 2a, 3 (principle), FIG. 2b (EPG request) and FIG. 2c (request mapping/resource allocation), as well as the more specific examples of FIG. 2d (IMS server system) and FIG. 4a (media session initialisation and EPG download), FIG. 4b (unicast session establishment), FIG. 4c (multicast session establishment), FIG. 4d (update of EPG), and FIG. 4e (media session initiation based on triggers) may not only be useful in the above mentioned scenarios. For example, it is also envisaged that the terminal device T2 may be constituted e.g. by a controller of a heating system in the home, by a surveillance camera, a home control device performing a control of home appliances (as in a so called "intelligent home"), a DVD or MP3 collection memory, or in fact any other physical unit in the house. The server IMS-S may be connected e.g. with a remote access device such as a mobile telephone. For example, in this case, the mobile phone may be used to remote access an off-the-shelf heating controller of the heating system in the home in a user-specific manner. The mobile phone may also send a trigger to a DVD or MP3 collection memory in the home to download to the mobile phone MP3 files or to establish video streaming of personal DVDs from the home memory to the mobile telephone by establishing a user-specific media session between the home memory and the mobile phone. The mobile phone may also be used to on/off, up/down, or zoom-in/zoom-out control an off-the-shelf camera of a surveillance system located in the home, e.g. by using the trigger messages, as in particular explained with respect to FIG. 4e. This may preferably be done by using the UPnP protocol. Thus the adaptation (mapping) of service attributes may also be used in many other working examples in the home using off-the-shelf home appliances, e.g. situations in which end terminals are used which do not have own IP addresses and which do not run a SIP protocol (first type protocol).

The present invention finds its applicability in a general communication system in which the service provision side operates on the basis of control data of a first type while the terminal devices operate on the basis of control data being of a second type. The gateway apparatus HiGA according to the present invention provides the necessary interoperability, i.e. the adaptation functions of the control plane of the first and second type. While special examples have been described with the first type being related to a SIP and the second type being related to HTTP, the invention may be used in any other communication system SYS comprising two different control protocols of a first and second type.

Furthermore, it should be noted that modifications and variations of the invention may be carried out within the scope of the attached claims.

Reference numerals in the claims only serve illustration purposes and do not limit the scope of these claims.

The invention claimed is:

1. A communication system, comprising a gateway apparatus, a plurality of terminal devices and a service providing server for providing services directly to said terminal devices through an access network by means of a media plane terminated directly in a terminal device from the service providing server wherein:
  a) said service providing server comprises a service memory for storing one or more services to be provided to said terminal devices, and at least one control protocol device of a first type providing first type control data in association with said one or more services to said gateway device;
  b) wherein said terminal devices each comprise a service processor for processing the service provided by said service providing server through said access network and a control protocol device of a second type, to said first type and providing second type control data in association with the execution of the service by said service processor to said gateway device; and wherein
  c) said gateway apparatus comprises one or more service-specific mapping devices for terminating in the gateway apparatus a control plane separated from the media plane by exchanging first type control data with said service providing server and second type control data with said terminal devices, wherein:
    said service-specific mapping devices provide to said service providing server first type control data on the basis of second type control data received from said terminal devices and receive first type control data from said first type control protocol device of the service providing server; and
    said service-specific mapping devices provide to said terminal devices second type control data on the basis of said first type control data received from said service providing server and receive said second type control data from said second type control protocol device of said terminal devices; and wherein
    said second type control data constitute a second type service request and said service specific mapping device is adapted to send as first type control data a first type enquiry request enquiring the service providing server whether said access network has enough resources to provide said service to the terminal device; wherein:
    said service providing server is adapted to send as first type control data an acknowledgement message indicating that there are enough resources for the service provision if the service providing server establishes that there are enough resources, and is adapted to send as first type control data a negative acknowledgement message indicating that there are not enough resources for the service provision if the service providing server establishes that there not enough resources; and,
    said gateway apparatus receives as said second type control data from said terminal device an Electronic Program Guide download request and said second type control data provided by said gateway apparatus comprises a personalized Electronic Program Guide.

2. The communication system in accordance with claim 1, wherein said service-specific mapping devices comprise at least one service-specific mapping device running an IPTV proxy application.

3. The communication system in accordance with claim 1, wherein said terminal device comprises a Set-Top-Box including as said service processor an MPEG2 decoder, said service providing server comprises in said service memory a Video on Demand service, said service-specific mapping devices comprise at least one service-specific mapping device running a Real Time Streaming Protocol proxy application and said control protocol is Real Time Streaming Protocol, and said resources are the bandwidth of lines in said access network.

4. The communication system in accordance with claim 1, wherein said gateway apparatus and said terminal devices are part of a customer premises network.

5. The communication system in accordance with claim 4, wherein said gateway apparatus is located in a residential gateway of said customer premises network.

6. The communication system in accordance with claim 1, wherein said gateway apparatus comprises in a memory said user identity.

7. The communication system in accordance with claim 6, wherein said user identity is stored on a plug-in inserted into said gateway apparatus or on an Universal Integrated Circuit card inserted into a memory of said gateway apparatus.

8. The communication system in accordance with claim 1, wherein said terminal device is one or more selected from the group comprising a set-top-box, a controller of a heating system, a surveillance system in the home, a camera or a central home controller of an intelligent house.

9. The communication system in accordance with claim 1, wherein said first type of said control data is Session Initiation Protocol and said second type of said control data is one of HTTP and Universal Plug and Play.

10. The communication system in accordance with claim 1, wherein said gateway apparatus receives from said service providing device as first type control data said downloaded Electronic Program Guide of first type and converts a format of said received Electronic Program Guide into a format supported by said terminal device.

11. The communication system in accordance with claim 1, wherein said gateway apparatus invokes a media session establishment between the terminal device and said service providing device.

12. The communication system in accordance with claim 11, wherein said media session establishment is a unicast media session establishment.

13. The communication system in accordance with claim 11, wherein said media session establishment is a multicast media session establishment.

14. The communication system in accordance with claim 1, wherein said gateway apparatus receives as first type control data an Electronic Program Guide update message.

15. The communication system in accordance with claim 1, wherein said gateway apparatus receives as first type control data an event trigger message and sends as second type control data a media session establishment message to said terminal device on the basis of said event trigger message.

16. A gateway apparatus of a communication system including a plurality of terminal devices and a service providing server for providing services directly to said terminal devices through an access network by means of a media plane terminated directly in a terminal device from the service providing server, wherein said service providing server comprises a service memory for storing one or more services to be provided to said terminal devices, and at least one control protocol device of a first type providing first type control data in association with said one or more services to said gateway device, wherein said terminal devices each comprise a service processor for processing the service provided by said service providing server through said access network and a control protocol device of a second type, different to said first type and providing second type control data in association with the execution of the service by said service processor to said gateway device, comprising:
  a) one or more service-specific mapping devices for terminating in the gateway apparatus a control plane separated from the media plane by exchanging first type control data with said service providing server and second type control data with said second type terminal devices, wherein
  said service-specific mapping devices provide to said service providing server first type control data on the basis of second type control data received from said terminal devices and receive first type control data from said first type control protocol device of the service providing server;
  said service-specific mapping devices provide to said terminal devices second type control data on the basis of said first type control data received from said service providing server and receive said second type control data from said second type control protocol device of said terminal devices; and wherein:
  said second type control data constitute a second type service request and said service specific mapping device is adapted to send as first type control data a first type enquiry request enquiring the service providing server whether said access network has enough resources to provide said service to the terminal device; wherein:
  said service providing server is adapted to send as first type control data an acknowledgement message indicating that there are enough resources for the service provision if the service providing server establishes that there are enough resources, and is adapted to send as first type control data a negative acknowledgement message indicating that there are not enough resources for the service provision if the service providing server establishes that there not enough resources; and,
  said gateway apparatus receives as said second type control data from said terminal device an Electronic Program Guide download request and said second type control data provided by said gateway apparatus comprises a personalized Electronic Program Guide.

17. The gateway apparatus in accordance with claim 16, wherein said service-specific mapping devices comprise at least one service-specific mapping device running an IPTV proxy application.

18. The gateway apparatus in accordance with claim 16, wherein said terminal device comprises a Set-Top-Box including as said service processor a MPEG2 decoder, said service providing server comprises in said service memory a Video on Demand service, said service-specific mapping devices comprise at least one service-specific mapping device running a Real Time Streaming Protocol proxy application and said control protocol is Real Time Streaming Protocol, and said resources are the bandwidth of lines in said access network.

19. The gateway apparatus in accordance with claim 16, wherein said gateway apparatus and said terminal devices are part of a customer premises network.

20. The gateway apparatus in accordance with claim 19, wherein said gateway apparatus is located in a residential gateway of said customer premises network.

21. The gateway apparatus in accordance with claim 16, wherein said gateway apparatus comprises in a memory said user identity.

22. The gateway apparatus in accordance with claim 21, wherein said user identity is stored on a plug-in inserted into said gateway apparatus or on an Universal Integrated Circuit card inserted into a memory of said gateway apparatus.

23. The gateway apparatus in accordance with claim 16, wherein said terminal device is selected from the group comprising a set-top-box, a controller of a heating system, a surveillance system in the home, a camera or a central home controller of an intelligent house.

24. The gateway apparatus in accordance with claim 16, wherein said first type of said control data is Session Initiation Protocol and said second type of said control data is one of HTTP and Universal Plug and Play.

25. The gateway apparatus in accordance with claim 16, wherein said gateway apparatus receives from said service providing device as first type control data said downloaded Electronic Program Guide of first type and converts a format of said received Electronic Program Guide into a format supported by said terminal device.

26. The gateway apparatus in accordance with claim 25, wherein said gateway apparatus invokes a media session establishment between the terminal device and said service providing device.

27. The gateway apparatus in accordance with claim 26, wherein said media session establishment is a unicast media session establishment.

28. The gateway apparatus in accordance with claim 26, wherein said media session establishment is a multicast media session establishment.

29. The gateway apparatus in accordance with claim 16, wherein said gateway apparatus receives as first type control data an Electronic Program Guide update message.

30. The gateway apparatus in accordance with claim 1, wherein said gateway apparatus receives as first type control data an event trigger message and sends as second type control data a media session establishment message to said terminal device on the basis of said event trigger message.

31. A communication method between a gateway apparatus, a plurality of terminal devices and a service providing server of a communication system for providing services directly to said terminal devices through an access network by means of a media plane terminated directly in a terminal device from the service providing server,
  wherein said service providing server comprises a service memory for storing one or more services to be provided to said terminal devices, and at least one control protocol device of a first type providing first type control data in association with said one or more services to said gateway device,
  wherein said terminal devices, each comprise a service processor for processing the service provided by said service providing server through said access network and a control protocol device of a second type, different to said first type, and including second type control data in association with the execution of the service by said service processor, and wherein:
  said gateway apparatus comprises one or mere service-specific mapping devices for terminating in the gateway apparatus a control plane separated from the media plane by exchanging first type control data with said service providing server and second type control data with said terminal devices, comprising the following steps:
  providing from at least one of said terminal devices to said gateway apparatus second type control data;
  providing from said service-specific mapping devices of said gateway apparatus to said service providing server first type control data on the basis of said second type control data provided from said terminal device;
  providing first type control data from said first type control protocol device of said service providing server to said gateway apparatus;
  providing from said service-specific mapping devices to said terminal device second type control data on the basis of said first type control data provided from said service providing server;
  said service specific mapping device sends as first type control data a first type enquiry request enquiring the service providing server whether said access network has enough resources to provide said service to the terminal device wherein said second type control data constitute a second type service request; and,
  said service providing server sends as first type control data an acknowledgement message indicating that there are enough resources for the service provision if the service providing server establishes that there are enough resources, and sends as first type control data a negative acknowledgement message indicating that there are not enough resources for the service provision if the service providing server establishes that there not enough resources;
    wherein said gateway apparatus receives as said second type control data from said terminal device an Electronic Program Guide download request and said second type control data provided by said gateway apparatus comprises a personalized Electronic Program Guide.

* * * * *